US006195209B1

United States Patent
Kreitzer et al.

(10) Patent No.: US 6,195,209 B1
(45) Date of Patent: Feb. 27, 2001

(54) PROJECTION LENSES HAVING REDUCED LATERAL COLOR FOR USE WITH PIXELIZED PANELS

(75) Inventors: Melvyn H. Kreitzer; Jacob Moskovich, both of Cincinnati, OH (US)

(73) Assignee: U.S. Precision Lens Incorporated, Cincinnati, OH (US)

( * ) Notice: Subject to any disclaimer, the term of this patent is extended or adjusted under 35 U.S.C. 154(b) by 0 days.

(21) Appl. No.: 09/304,693

(22) Filed: May 4, 1999

(51) Int. Cl.[7] .................................................. G02B 3/00
(52) U.S. Cl. .................... 359/649; 359/650; 359/651; 359/689
(58) Field of Search .................... 359/649, 650, 359/651, 689, 691

(56) References Cited

U.S. PATENT DOCUMENTS

| 5,159,496 | 10/1992 | Kataoka | 359/754 |
|---|---|---|---|
| 5,172,275 | 12/1992 | DeJager | 359/755 |
| 5,200,861 | 4/1993 | Moskovich | 359/662 |
| 5,210,646 | 5/1993 | Mercado et al. | 359/793 |
| 5,218,480 | 6/1993 | Moskovich | 359/753 |
| 5,313,330 | 5/1994 | Betensky | 359/676 |
| 5,526,186 | 6/1996 | Sekine | 359/683 |
| 5,625,495 | * 4/1997 | Moskovich | 359/663 |
| 5,867,326 | * 2/1999 | Yamamoto | 359/686 |
| 5,900,987 | * 5/1999 | Kreitzer | 359/649 |
| 5,900,989 | * 5/1999 | Kreitzer | 359/691 |
| 5,969,874 | * 10/1999 | Moskovich | 359/651 |
| 5,991,089 | * 11/1999 | Kreitzer | 359/649 |
| 6,028,715 | 2/2000 | Takamoto et al. | 359/688 |

FOREIGN PATENT DOCUMENTS 809 407    11/1997   (EP) .

OTHER PUBLICATIONS

Hoogland, J., "The Design of Apochromatic Lenses," *Recent Development in Optical Design*, R.A. Ruhloff editor, Perkin–Elmer Corporation, Norwalk, CT, 1968, pp. 6–1 to 6–7.
Hoya Corporation's catalog entitled "Optical Glass," Section 2.4, 1984.
Schott Glass Technologies's catalog entitled "Schott Optical Glass," Section 2.2, 1992.

* cited by examiner

Primary Examiner—Georgia Epps
Assistant Examiner—Tim Thompson
(74) Attorney, Agent, or Firm—Maurice M. Klee

(57) ABSTRACT

Projection lens for use with pixelized panels are provided which consist of a first lens unit which has a negative power and a second lens unit which has a positive power. The V-values and Q-values of the lens elements of the first and second lens units are selected so that the projection lenses can simultaneously have: (1) a high level of lateral color correction, including correction of secondary lateral color; (2) low distortion; (3) a large field of view in the direction of the image (screen); (4) a telecentric entrance pupil; and (5) a relatively long back focal length.

31 Claims, 10 Drawing Sheets

PROJECTION LENSES HAVING REDUCED LATERAL COLOR FOR USE WITH PIXELIZED PANELS

FIELD OF THE INVENTION

This invention relates to projection lenses and, in particular, to projection lenses which can be used, inter alia, to form an image of an object composed of pixels, e.g., an LCD, a reflective LCD, a DMD, or the like.

DEFINITIONS

As used in this specification and in the claims, the following terms shall have the following meanings:

(1) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity. Since light can propagate through a lens in either direction, the pupil at infinity can serve as either an entrance or an exit pupil depending upon the lens' orientation with respect to the object and the image. Accordingly, the term "telecentric pupil" will be used herein to describe the lens' pupil at infinity, whether that pupil is functioning as an entrance or an exit pupil.

In practical applications, the telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have at least one pupil at a long distance from the lens' elements, and the term "telecentric pupil" is used to describe such a pupil at a long distance from the lens' elements. For the projection lenses of the invention, the telecentric pupil distance will in general be at least about 10 times the lens' focal length.

(2) Q-Value

As described in J. Hoogland, "The Design of Apochromatic Lenses," in *Recent Development in Optical Design*, R. A. Ruhloff editor, Perkin-Elmer Corporation, Norwalk, Conn., 1968, pages 6-1 to 6-7, the contents of which are incorporated herein by reference, Q-values can be calculated for optical materials and serve as a convenient measure of the partial dispersion properties of the material.

Hoogland's Q-values are based on a material's indices of refraction at the e-line (546 nanometers), the F' line (480 nanometers), and the C' line (643.8 nanometers). The wavelengths used herein, both in the specification and in the claims, are the d line (587.56 nanometers), the F line (486.13 nanometers), and the C line (656.27 nanometers).

(3) V-Value

In the specification and the claims, V-values are for the d, F, and C lines.

(4) Composite V-Value

In accordance with certain aspects of the invention (see below), projection lenses are provided having a positive second lens unit ($U_2$) which has a composite V-value ($V_{U2/C}$) defined by the following formula:

$$V_{U2/C} = f_{U2}\{\Sigma(V_{U2/i}/f_{U2/i})\}$$

where $f_{U2}$ is the focal length of the second lens unit, $f_{U2/i}$ and $V_{U2/i}$ are the focal length and V-value of the $i^{th}$ lens element of the second lens unit, and the summation is over all lens elements of the second lens unit.

(5) Pseudo-Aperture Stop

The term "pseudo-aperture stop" is used herein in the same manner as it is used in commonly-assigned U.S. Pat. No. 5,313,330 to Ellis Betensky, the contents of which are incorporated herein by reference.

(6) Zoom Lenses

In certain embodiments, the projection lens of the invention is a zoom lens. In applying the various aspects of the invention to these embodiments, the properties of the lens, e.g., its focal length, back focal length, field of view, aperture stop or pseudo-aperture stop location, telecentricity, etc., are evaluated at the zoom lens' short focal length position.

BACKGROUND OF THE INVENTION

Projection lens systems (also referred to herein as "projection systems") are used to form an image of an object on a viewing screen. Such systems can be of the front projection or rear projection type, depending on whether the viewer and the object are on the same side of the screen (front projection) or on opposite sides of the screen (rear projection).

The basic structure of such a system is shown in FIG. 10, where 10 is a light source (e.g., a tungsten-halogen lamp), 12 is illumination optics which forms an image of the light source (hereinafter referred to as the "output" of the illumination system), 14 is the object which is to be projected (e.g., an LCD matrix of on and off pixels), and 13 is a projection lens, composed of multiple lens elements, which forms an enlarged image of object 14 on viewing screen 16. The system can also include a field lens unit, e.g., a Fresnel lens, in the vicinity of the pixelized panel to appropriately locate the exit pupil of the illumination system.

For front projection systems, the viewer will be on the left side of screen 16 in FIG. 10, while for rear projection systems, the viewer will be on the right side of the screen. For rear projection systems which are to be housed in a single cabinet, a mirror is often used to fold the optical path and thus reduce the system's overall size.

Projection lens systems in which the object is a pixelized panel are used in a variety of applications. Such systems preferably employ a single projection lens which forms an image of, for example, a single panel having red, green, and blue pixels. In some cases, e.g., large image rear projection systems, multiple panels and multiple projection lenses are used, with each panel/projection lens combination producing a portion of the overall image. In either case, projection lenses used with such systems generally need to have a relatively long back focal length to accommodate the prisms, beam splitters, color wheels, etc. normally used with pixelized panels.

A particularly important application of projection lens systems employing pixelized panels is in the area of microdisplays, e.g., front projection systems which are used to display data and rear projection systems which are used as computer monitors. Recent breakthroughs in manufacturing technology has led to a rise in popularity of microdisplays employing digital light valve devices such as DMDs, reflective LCDs, and the like.

Projection displays based on these devices offer advantages of small size and light weight. As a result, a whole new class of ultra portable lightweight projectors operating in front-projection mode and employing digital light valves has appeared on the market. Lightweight compact rear-projection systems can also be achieved through the use of these devices.

To display images having a high information content, these devices must have a large number of pixels. Since the devices themselves are small, the individual pixels are small, a typical pixel size ranging from $17\mu$ for DMD displays to approximately $8\mu$ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. These problems are typically most severe at the edges of the field.

All of the aberrations of the system need to be addressed, with lateral color, chromatic variation of coma, astigmatism, and distortion typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

The above-mentioned microdisplays typically require that the light beam from the illumination system has a near-normal angle of incidence upon the display. In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the stop which makes the correction of lateral color more difficult.

In addition to the foregoing, for rear projection systems, there is an ever increasing demand for smaller cabinet sizes (smaller footprints). In terms of the projection lens, this translates into a requirement that the lens has a wide field of view in the direction of the image (screen). This requirement makes it even more difficult to correct the lateral color of the lens. Similarly, the requirement for a relatively long back focal length also makes it more difficult to correct lateral color.

SUMMARY OF THE INVENTION

In view of the foregoing, there exists a need in the art for projection lenses for use with pixelized panels which have some and preferably all of the following properties:

(1) a high level of lateral color correction, including correction of secondary lateral color;

(2) low distortion;

(3) a large field of view in the direction of the image;

(4) a telecentric entrance pupil; and (5) a relatively long back focal length.

The projection lenses of the invention address this need as follows.

In accordance with a first aspect, the invention provides a projection lens for forming an image of an object which consists in order from its image end to its object end of:

(A) a first lens unit $U_1$ having a negative power and comprising three lens elements $E_P$, $E_N$, and $E_{N'}$, arranged in any order and having focal lengths $f_{U1/P}$, $f_{U1/N}$, and $f_{U1/N'}$, V-values $V_{U1/P}$, $V_{U1/N}$, and $V_{U1/N'}$, and Q-values $Q_{U1/P}$, $Q_{U1/N}$, and $Q_{U1/N'}$, respectively;

(B) a second lens unit having a positive power; and (C) an optional field lens unit;

wherein:

$f_{U1/P} > 0$, $f_{U1/N} < 0$, $f_{U1/N'} < 0$, $V_{U1/N} > V_{U1/P}$, $Q_{U1/N} > 0$, $Q_{U1/N} > Q_{U1/P}$, $Q_{U1/N} > V_{U1/N}$, $Q_{U1/N'} > 0$, and $Q_{U1/N'} > Q_{U1/P}$.

Examples 1A, 1B, 1C, 2A, and 3–7 illustrate this first aspect of the invention.

In accordance with a second aspect, the invention provides a projection lens for forming an image of an object which consists in order from its image end to its object end of:

(A) a first lens unit $U_1$ having a negative power and comprising two lens elements $E_P$ and $E_N$, arranged in any order and having focal lengths $f_{U1/P}$ and $f_{U1/N}$, V-values $V_{U1/P}$ and $V_{U1/N}$, and Q-values $Q_{U1/P}$ and $Q_{U1/N}$, respectively;

(B) a second lens unit having a positive power; and (C) an optional field lens unit;

wherein:

$f_{U1/P} > 0$, $f_{U1/N} < 0$, $V_{U1/N} > V_{U1/P}$, $Q_{U1/N}>0$, and $Q_{U1/P}<0$.

Examples 1A, 1B, 1C, 3, 5, and 6 illustrate this second aspect of the invention.

In accordance with a third aspect, the invention provides a projection lens for forming an image of an object which consists in order from its image end to its object end of:

(A) a first lens unit $U_1$ having a negative power and comprising two lens elements $E_P$ and $E_N$, arranged in any order and having focal lengths $f_{U1/P}$ and $f_{U1/N}$, V-values $V_{U1/P}$ and $V_{U1/N}$, and Q-values $Q_{U1/P}$ and $Q_{U1/N}$, respectively;

(B) a second lens unit having a positive power; and (C) an optional field lens unit;

wherein:

$f_{U1/P}>0$, $f_{U1/N}<0$, $V_{U1/N}>V_{U1/P}$, $Q_{U1/N}>V_{U1/N}$, and $Q_{U1/N}>125$.

Preferably, $Q_{U1/N}$ is greater than 135, and most preferably greater than 145.

Examples 1D, 1G, and 3 illustrate this third aspect of the invention.

In accordance with a fourth aspect, the invention provides a projection lens for forming an image of an object which consists in order from its image end to its object end of:

(A) a first lens unit $U_1$ having a negative power;

(B) a second lens unit $U_2$ having a positive power and comprising two lens elements $E'_P$ and $E'_N$, arranged in any order and having focal lengths $f_{U2/P}$ and $f_{U2/N}$, V-values $V_{U2/P}$ and $V_{U2/N}$, and Q-values $Q_{U2/P}$ and $Q_{U2/N}$, respectively; and (C) an optional field lens unit;

wherein:

$f_{U2/P}>0$, $f_{U2/N}<0$, $V_{U2/P}>V_{U2/N}$, $Q_{U2/P}>V_{U2/P}$, and $Q_{U2/P}>135$ (preferably, $Q_{U2/P}>145$).

Examples 1E, 1F, 1G, 2A, 7 and 9 illustrate this fourth aspect of the invention.

In accordance with a fifth aspect, the invention provides a projection lens for forming an image of an object composed of pixels, said projection lens consisting in order from its image end to its object end of:

(A) a first lens unit $U_1$ having a negative power;

(B) an aperture stop or a pseudo-aperture stop;

(C) a second lens unit $U_2$ having a positive power and comprising a positive lens elements having a V-value $V_{U2/P}$; and (D) an optional field lens unit;

wherein:

$V_{U2/P}>75$, and $V_{U2/C}>0.1/(p' \cdot F\#_{U2})$, where VU2/c is the composite V-value of the second lens unit defined above, $F\#_{U2}$ is the f-number of the second lens unit as traced from the object (pixelized panel) towards the image, and p' is the pixel width divided by $f_0$, where $f_0$ is the focal length of the combination of the first and second lens units. Preferably, $V_{U2/P}$ is greater than 80.

Examples 1A, 1C, 1E, 2A, 2B, 3, 4, 5, 7, 8 and 9 illustrate this fifth aspect of the invention.

As illustrated in the examples, the various aspects of the invention can be used separately or preferably in combination. As also illustrated in the examples, by means of these various aspects of the invention, retrofocus projection lenses are provided having some and preferably all of the following properties:

(i) the projection lens has a half field of view in the direction of the image of at least 20° and preferably at least 25°;

(ii) the lateral color blur of the projection lens at its full field for wavelengths in the range from 460 nanometers to 620 nanometers is less than a pixel and preferably less than three-quarters of a pixel (note that the level of lateral color correction can be determined at the object plane or the image plane, a magnified pixel being used when the determination is performed at the image plane);

(iii) the distortion of the projection lens is less than 1.5 percent, preferably less than 1.0 percent, and most preferably less than 0.5 percent;

(iv) the ratio of the lens's back focal length (BFL) to its focal length is greater than 0.7, preferably greater than 1.0, and most preferably greater than 1.5.

The projection lenses of the invention can be designed using the location of the output of the illumination system as a pseudo-aperture stop/entrance pupil of the projection lens (see the above-referenced Betensky patent). In this way, efficient coupling is achieved between the light output of the illumination system and the projection lens.

Figure 1:
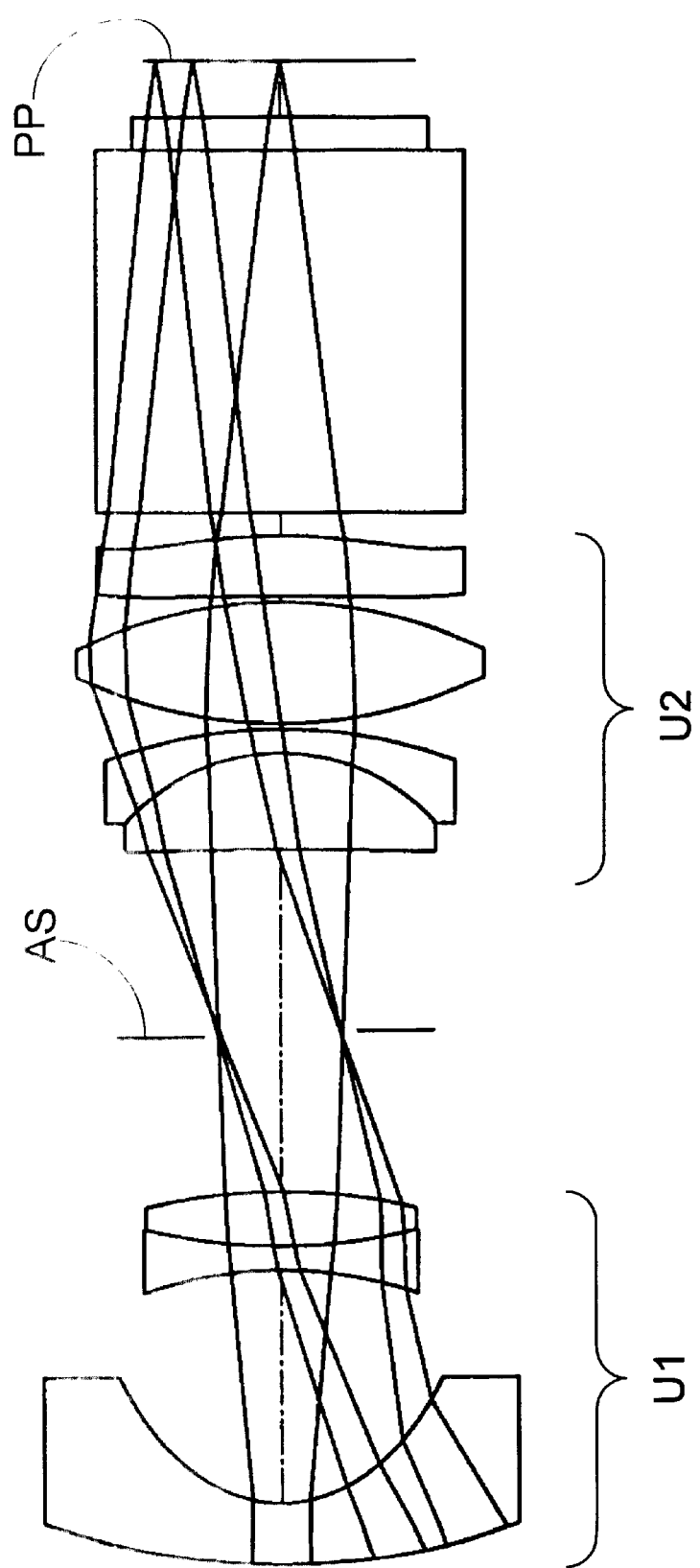
FIGS. 1–9 are schematic side views of projection lenses constructed in accordance with the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention are of the retrofocus or the inverted telephoto type and consist of two lens units, i.e., a negative unit ($U_1$) on the long conjugate side and a positive unit ($U_2$) on the short conjugate side, which are typically separated by an aperture stop or a pseudo-aperture stop.

The use of this overall lens form to produce an image of a pixelized panel has various advantages. Thus, telecentricity is readily achieved by locating the lens' aperture stop or pseudo-aperture stop in the front focal plane of the second positive unit. Additional advantages are a long back focal length and the ability to handle a wide field of view. Both of these characteristics are particularly useful in rear projection systems, where the lens must have a wide field of view to achieve the smallest possible overall package size, and where there is a need to accommodate beam splitting prisms between the lens and the pixelized panel. These prisms may include polarizing beam splitters, as well as color splitting prisms.

The lenses of the invention achieve a high level of distortion correction by using one or more aspherical surfaces in the first lens unit. Some residual distortion, as well as spherical aberration of the lens' entrance pupil, is corrected through the use of one or more aspherical surfaces in the second lens unit. The spherical aberration of the entrance pupil should be minimized to achieve telecentricity for any arbitrary point in the object plane of the lens. Preferably, the aspherical surfaces are formed on plastic lens elements.

The most critical aberration that must be corrected is the lens' lateral color. In accordance with the first through fourth aspects of the invention set forth above, the design strategy for correcting this aberration is as follows:

(1) For the negative first lens unit:
  (a) To correct primary lateral color, high dispersion (low V-value) positive elements in combination with low dispersion (high V-value) negative elements are used.
  (b) To correct secondary lateral color, the high dispersion (low V-value) positive elements should be as strongly positive as possible and should preferably have a negative Q-value and the low dispersion (high V-value) negative elements should be as strongly negative as possible with positive Q-values (preferably, large positive Q-values).

(2) For the positive second lens unit:
  (a) To correct primary lateral color, as well as primary axial color, low dispersion (high V-value) positive elements in combination with high dispersion (low V-value) negative elements are used.
  (b) To correct secondary lateral color, the low dispersion (high V-value) positive elements should be as strongly positive as possible and should have positive Q-values (preferably, large positive Q-values) and the high dispersion (low V-value) negative elements should be as strongly negative as possible with negative Q-values or positive Q-values which are as small as possible.

In general terms, a high dispersion material is a material having a dispersion like flint glass and a low dispersion material is a material having a dispersion like crown glass. More particularly, high dispersion flint materials are those having V-values ranging from 20 to 50 for an index of refraction in the range from 1.85 to 1.5, respectively, and low dispersion crown materials are those having V-values ranging from 35 to 75 for the same range of indices of refraction.

For plastic lens elements, the high and low dispersion materials can be styrene and acrylic, respectively. Other plastics can, of course, be used if desired. For example, in place of styrene, polycarbonates and copolymers of polystyrene and acrylic (e.g., NAS) having flint-like dispersions can be used. In place of acrylic, cyclic olefin copolymers, e.g., Topas 5013 manufactured by Hoechst, can be used. For a general discussion of optical plastics, see *The Handbook of Plastic Optics*, U.S. Precision Lens, Inc., Cincinnati, Ohio, 1983, pages 17–29.

In terms of the "crown" and "flint" designations, the design strategy of the first through fourth aspects of the invention can be summarized as:

(1) For the negative first lens unit, use positive flints which preferably have negative Q-values with negative crowns having positive Q-values (preferably, large positive Q-values).

(2) For the positive second lens unit, use positive crowns having positive Q-values (preferably, large positive Q-values) with negative flints having negative Q-values or small positive Q-values.

The fifth aspect of the invention is directed specifically to the V-values of the lens elements used in the second lens unit. In retrofocus lenses, correction of axial color is preferably achieved in the rear (second) unit since the height of the axial marginal ray is largest in that unit. Such correction is achieved through the use of low dispersion glasses in positive power elements and high dispersion glasses in negative power elements.

Lateral color correction, on the other hand, is preferably achieved in the front (first) unit where the chief ray height is significantly larger than that of the axial marginal ray. In this case, the correction is achieved through the use of high dispersion glasses in positive power elements and low dispersion glasses in negative power elements, i.e., the reverse of the rear unit.

In telecentric lenses of the type disclosed herein, the height of the chief ray in the rear unit is not insignificant. As a result, the choice of glasses in that unit can have a substantial effect on the correction the lateral color. In particular, it has been found that lateral color can be significantly improved when the rear unit includes at least one positive lens element having a V-value greater than 75 and where the composite V-value of the rear unit $V_{U2,C}$ satisfies the relationship:

$$V_{U2/C} > 0.1/(p' \cdot F\#_{U2}),$$

where p' and $F\#_{U2}$ are as defined above.

This aspect of the invention is based on the discovery that the lateral color of the entire lens can be improved by reducing axial color aberrations between the lens' entrance pupil and its aperture stop. That is, the image of the entrance pupil by the rear unit should have small axial color to achieve low lateral color for the entire lens.

This interaction between the axial color of the rear unit and the lateral color of the entire lens can be seen as follows. Consider red, green, and blue chief rays. If the axial color of the rear unit is small, after passing through the rear unit, these rays will strike the optical axis at essentially the same location (the aperture stop) with essentially the same angle. Accordingly, when these rays enter the front unit they will be at essentially the same height. The ability of the front unit to correct lateral color will thus be improved. For a telecentric entrance pupil, the red, green, and blue chief rays will, of course, enter the entrance pupil substantially parallel to the optical axis.

When $V_{U2/C}$ satisfies the above relationship, the axial color of the rear unit's image of the entrance pupil is improved and thus the lens' overall lateral color relative to the size of a pixel is improved.

Without intending to limit it in any manner, the present invention will be more fully described by the following examples.

EXAMPLES

Figure 2:
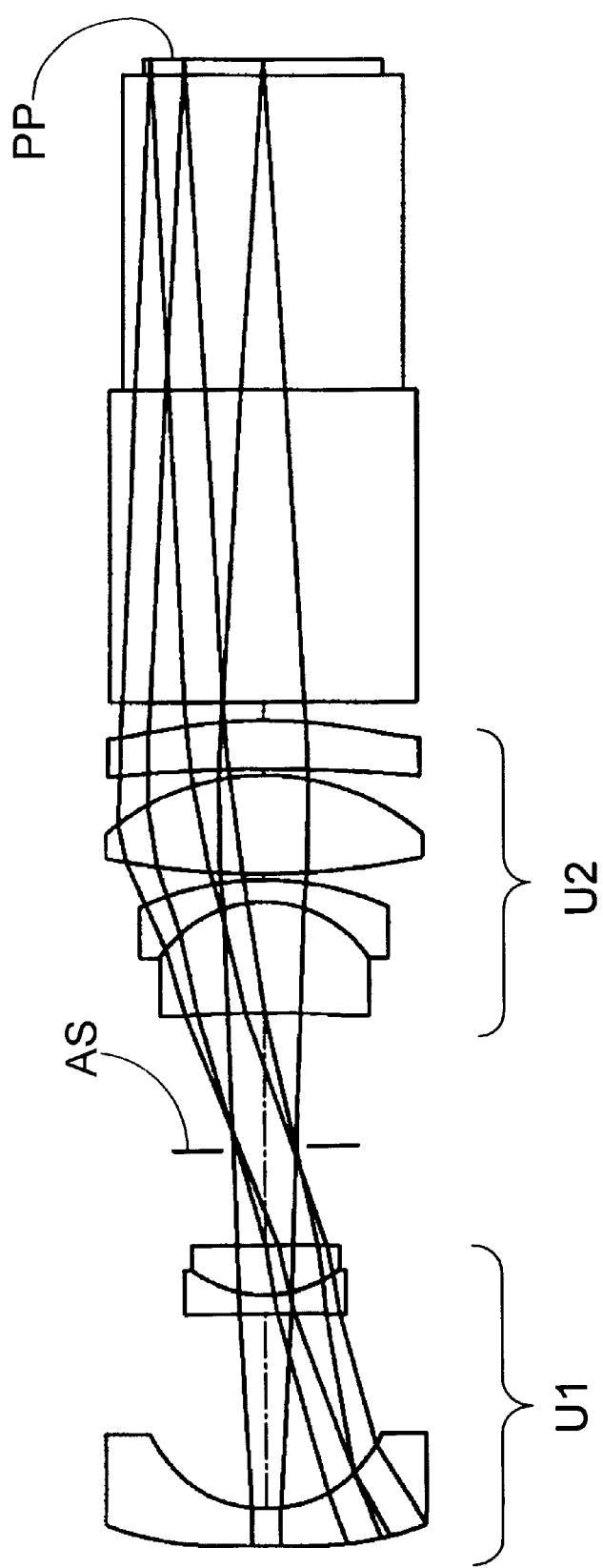
Figure 3:
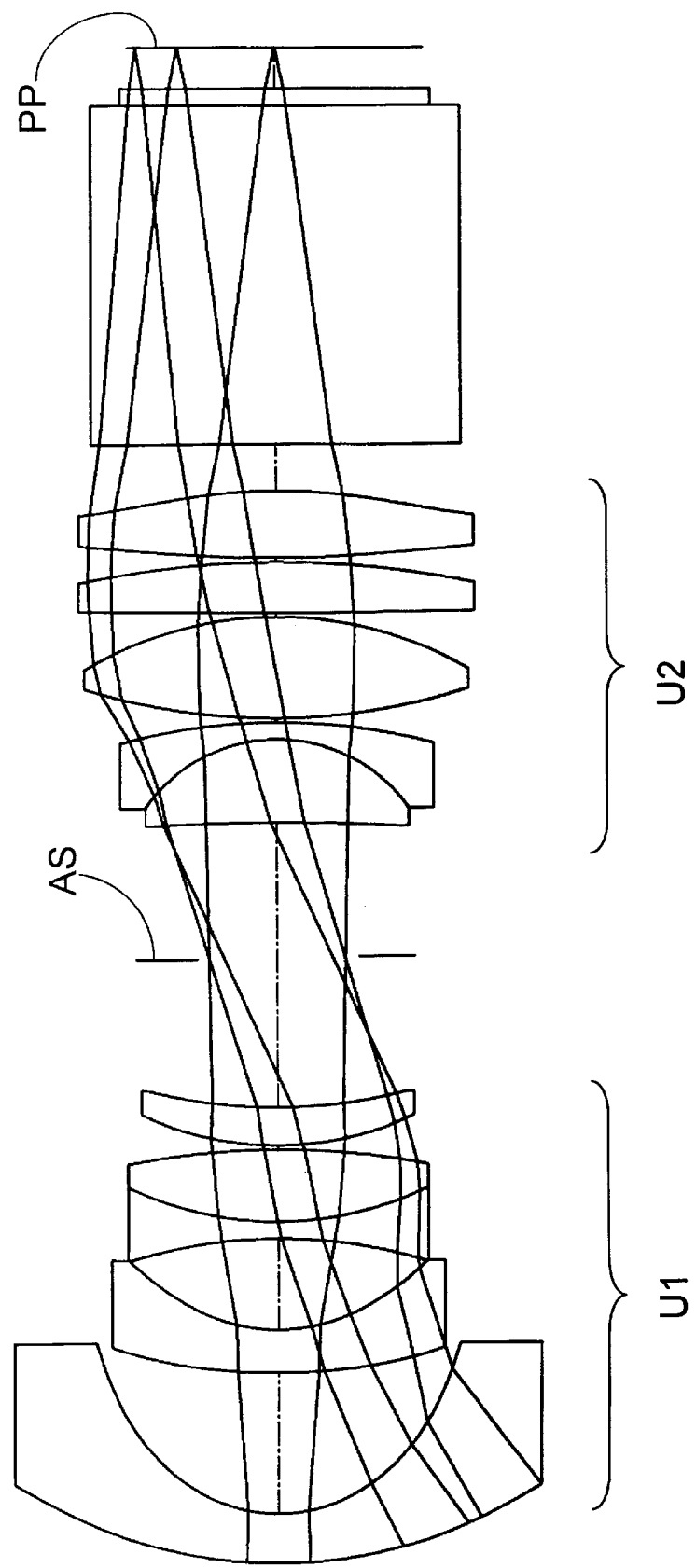
Figure 4:
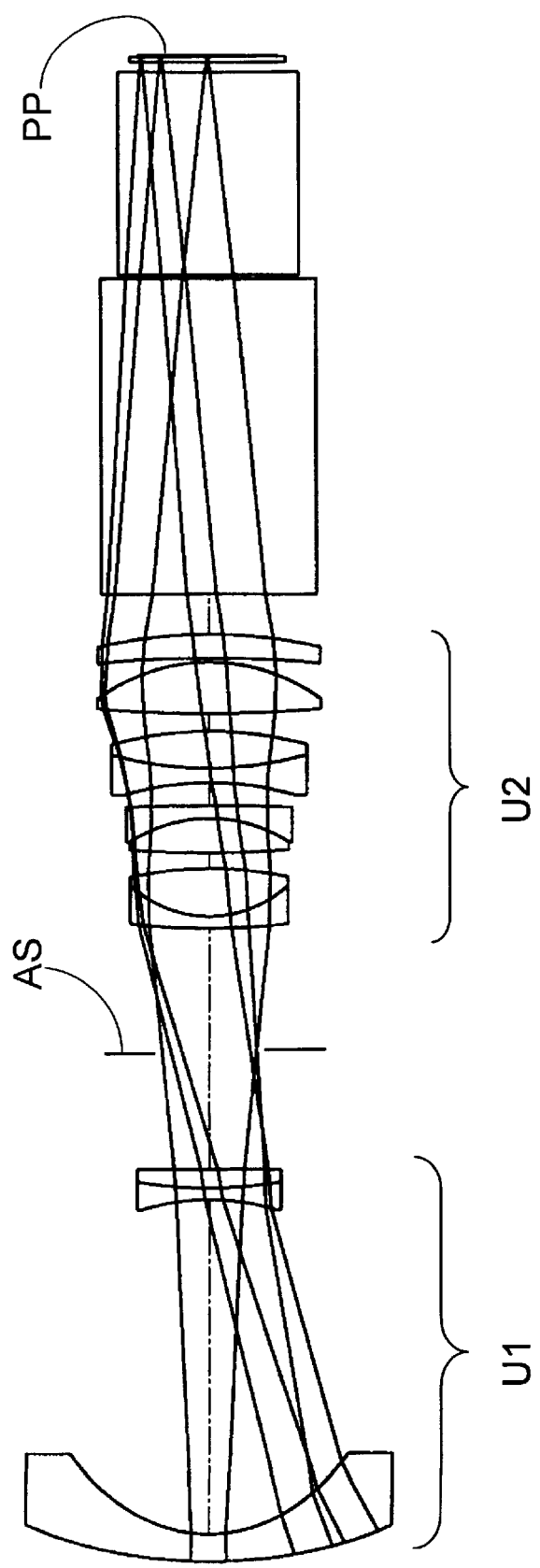
Figure 5:
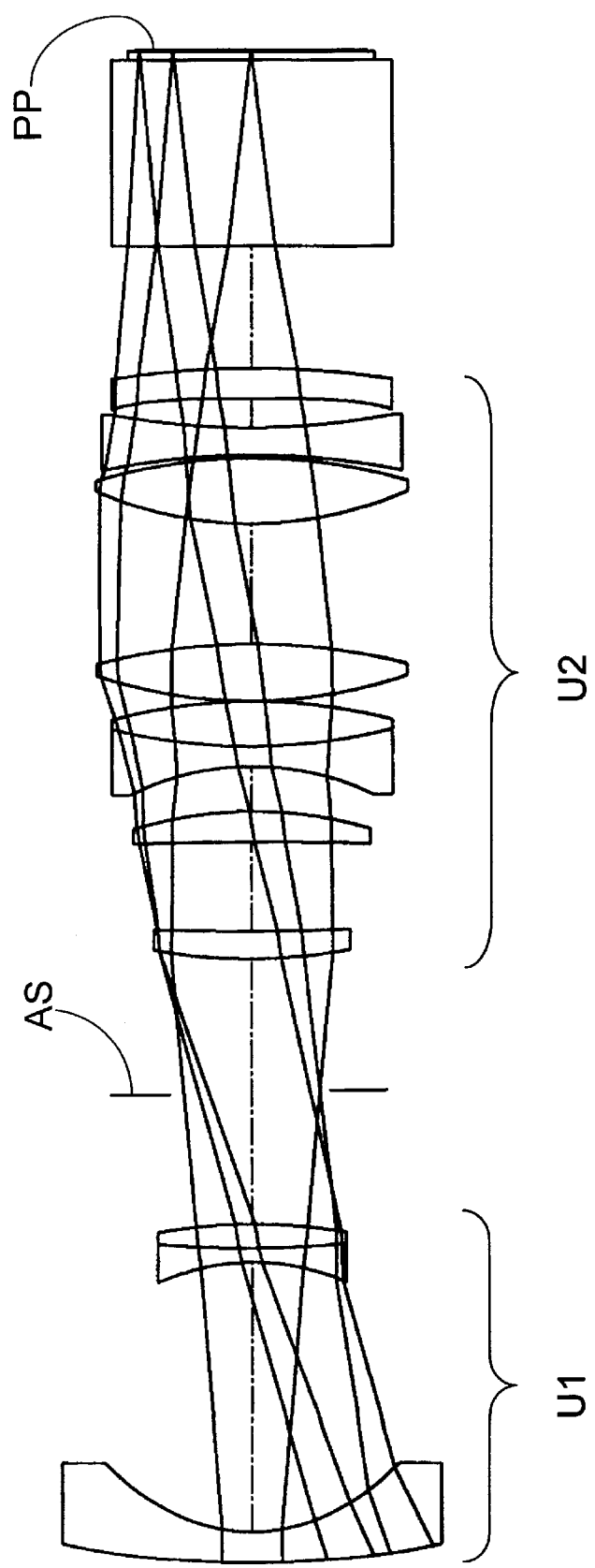
Figure 6:
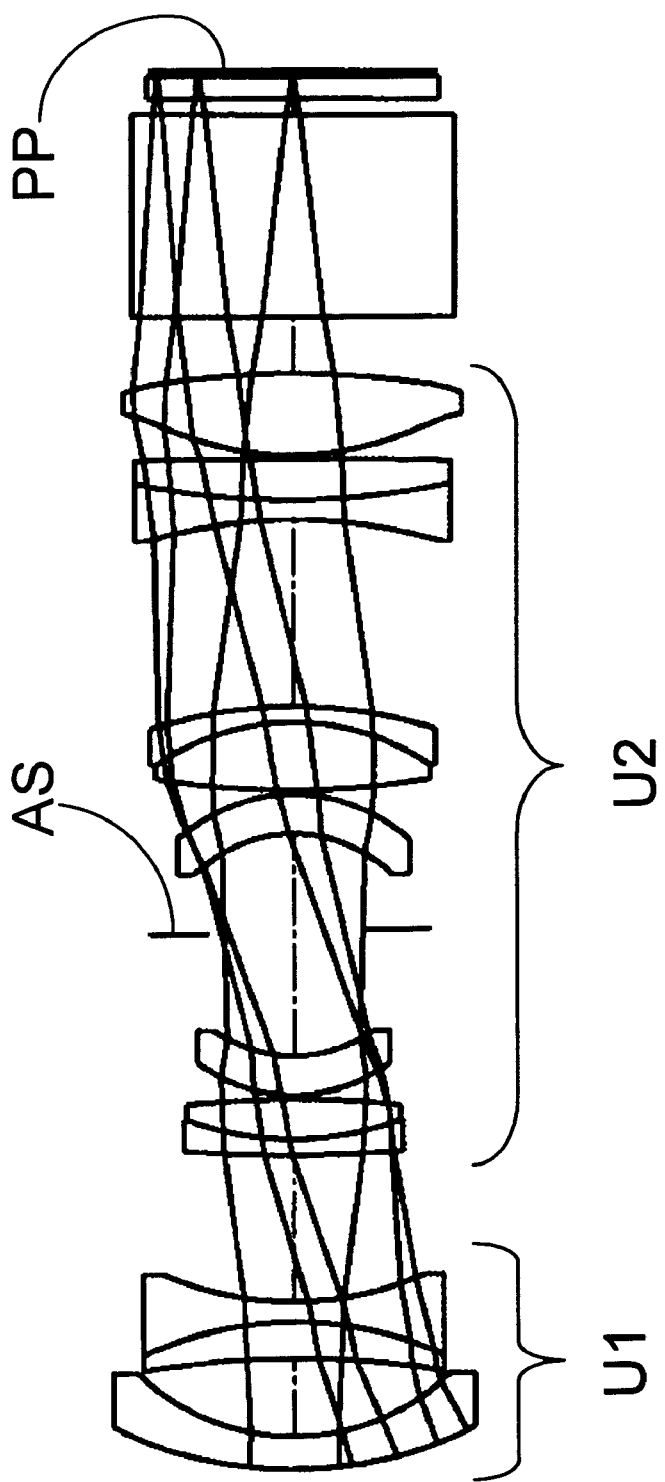
Figure 7:
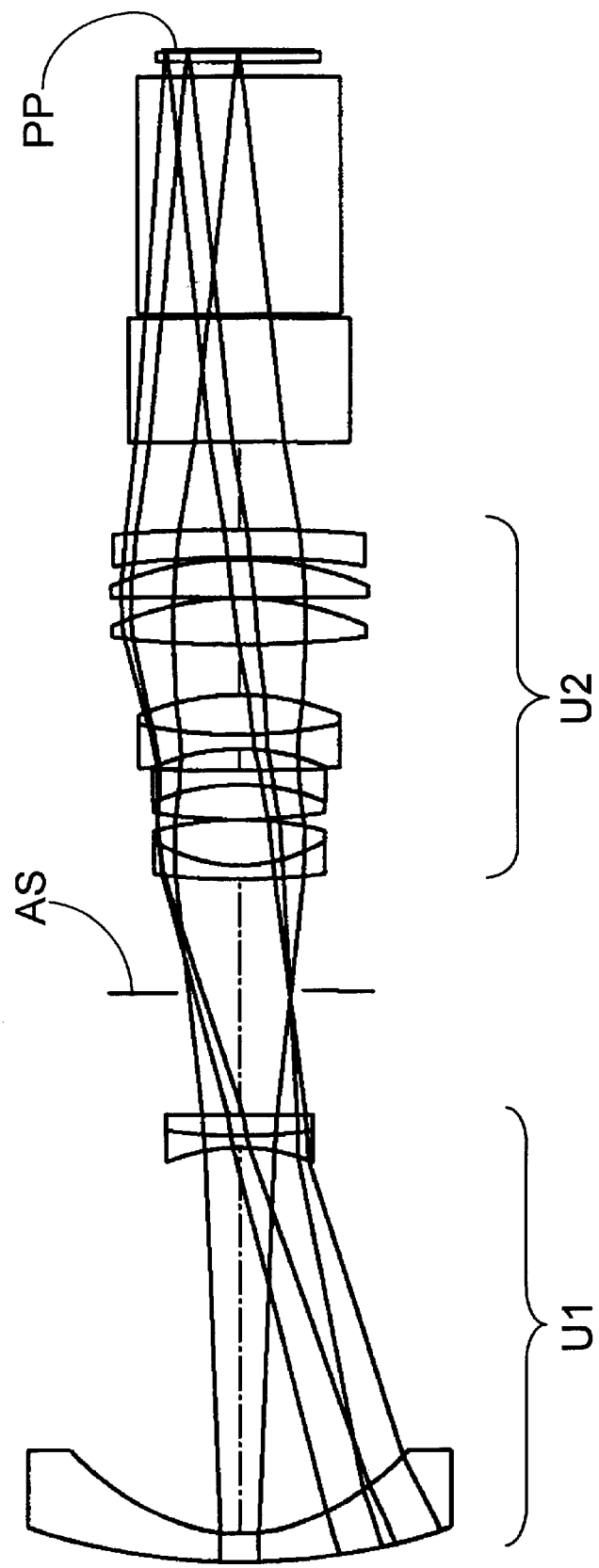
Figure 8:
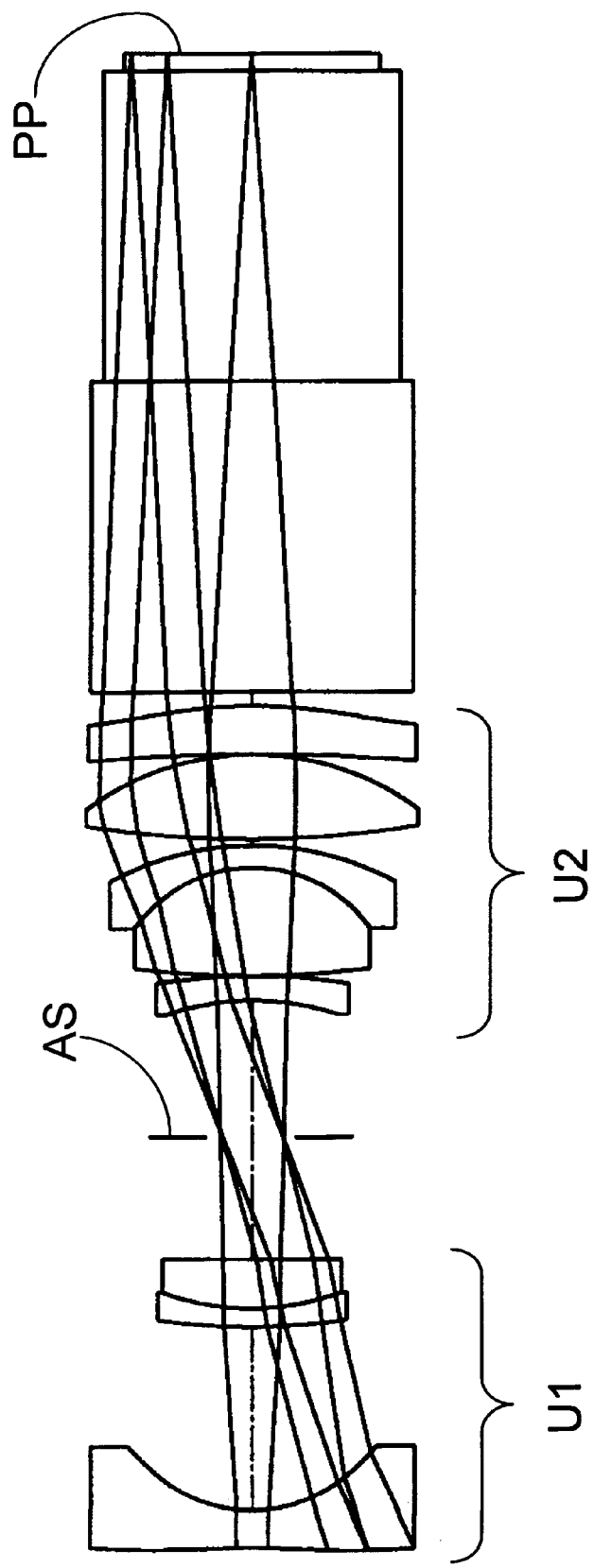
Figure 9:
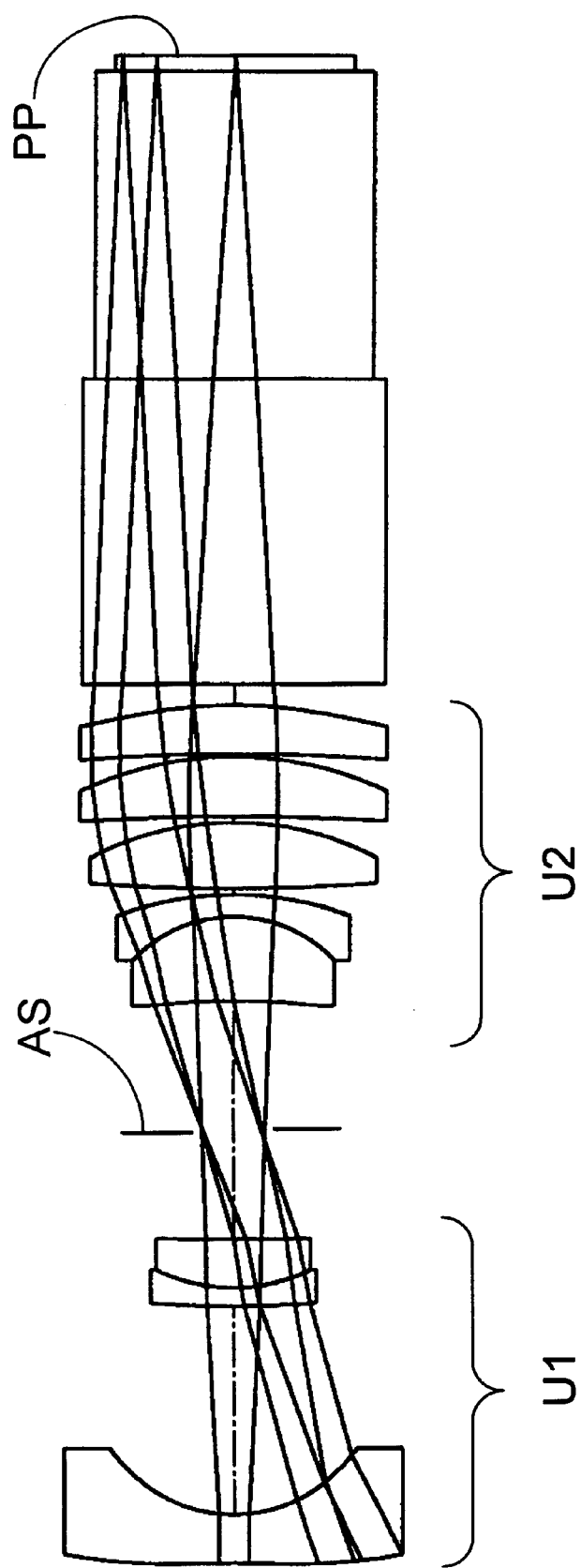
Figure 10:
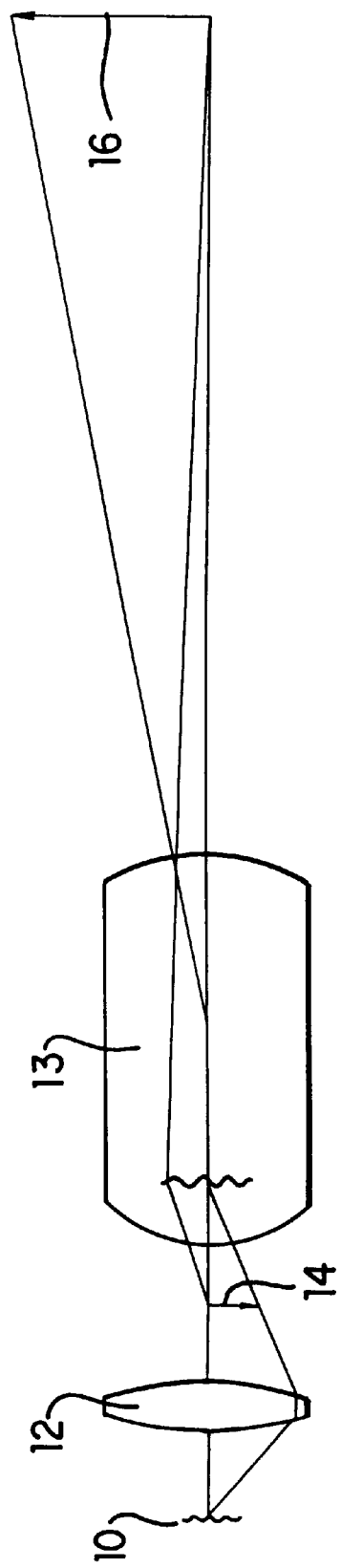
FIG. 10 is a schematic diagram showing an overall projection lens system in which the projection lenses of the present invention can be used.

FIGS. 1–9 illustrate projection lenses constructed in accordance with the invention. Corresponding prescriptions and optical properties appear in Tables 1–9, respectively. Note that Example 1H is a comparative example and does not employ any of the aspects of the invention.

HOYA, OHARA, or SCHOTT designations are used for the various glasses employed in the lens systems. Equivalent glasses made by other manufacturers can be used in the practice of the invention. Industry acceptable materials are used for the plastic elements. The designation 490573 used in Tables 4, 5, and 7 represents acrylic plastics having an index of refraction of 1.490 and a V-value at the d line of 57.3.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–9.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero. The various planar structures located on the short conjugate side of $U_2$ in the figures and tables represent components which are used with or are a part of the pixelized panel. They do not constitute part of the projection lens. All dimensions given in the tables are in millimeters.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification and in the claims. The pixelized panel is shown in the figures by the designation "PP" and the aperture stop or pseudo-aperture stop is shown by the designation "AS".

The projection lenses of the invention can be focused in various ways, e.g., by moving the entire lens relative to the pixelized panel. In addition to focusing, the projection lens can also have zoom capabilities as illustrated in Examples 4–7. Conventional mechanisms known in the art are used to move the lens and/or its component parts during focusing and zooming.

The zoom projection lenses of Examples 4, 5, and 7 were designed using the pseudo-aperture stop/entrance pupil technique of Betensky, U.S. Pat. No. 5,313,330. In accordance with this approach, the illumination system is used to define the entrance pupil for the projection lens, with the entrance pupil being located at a constant position relative to the pixelized panel for all lens focal lengths and conjugates. The location of this pupil is determined by the substantially parallel light (substantially telecentric light) which passes through the pixelized panel from the illumination system.

Table 10 summarizes various properties of Examples 1A, 2A, 2B, 3, 8, and 9 which were designed in accordance with the fifth aspect of the invention. As shown in this table, each of these lenses has a $V_{U2/C}$ value which is greater than $0.1/(p' \cdot F\#_{U2})$. As shown by their corresponding prescription tables, each of these examples also includes a positive lens element in its rear unit which has a V-value greater than 75.

Table 11 summarizes various properties of the lenses of Examples 1–9. As can be seen from this table and from the corresponding prescription tables, the lens systems of the invention have the five desired properties discussed above for projection lenses which are to be used with pixelized panels. A comparison of Examples 1A through 1G, which employ various aspects of the invention, with Example 1G, which does not employ any aspect of the invention, further shows that the lenses of the invention achieve improved lateral color correction.

It is important to note that the lenses of the invention achieve all of the above desired properties in a manner which allows the lenses to be manufactured at a cost suitable for a consumer item, e.g., a computer monitor. This is especially so when the high Q lens elements are composed of a COC plastic.

Although specific embodiments of the invention have been described and illustrated, it is to be understood that a variety of modifications which do not depart from the scope and spirit of the invention will be evident to persons of ordinary skill in the art from the foregoing disclosure.

TABLE 1A

| Surf. No. | Type | Radius | Thickness | Glass | Clear Aperture Diameter |
|---|---|---|---|---|---|
| 1 | a | 59.3714 | 5.00000 | ACRYLIC | 36.80 |
| 2 | ac | 10.6086 | 19.08902 | | 24.45 |
| 3 | | −34.1021 | 2.00000 | S-FPL51 | 20.41 |
| 4 | | 45.8791 | 4.50000 | S-LAH60 | 20.06 |
| 5 | | −45.8791 | 12.81672 | | 19.73 |
| 6 | | Aperture stop | 15.63439 | | 10.16 |
| 7 | | −403.8211 | 8.00000 | S-FPL51 | 21.66 |
| 8 | | −16.6819 | 2.00000 | S-TIH4 | 23.40 |
| 9 | | −40.3246 | 0.50000 | | 26.59 |
| 10 | | 37.7035 | 10.00000 | S-FPL51 | 30.87 |
| 11 | | −37.7035 | 0.50000 | | 31.24 |
| 12 | a | −350.0000 | 5.00000 | ACRYLIC | 30.04 |
| 13 | a | −43.6995 | 1.92883 | | 29.02 |
| 14 | | ∞ | 30.00000 | BK7 | 28.12 |
| 15 | | ∞ | 2.75000 | SIO2 | 22.19 |
| 16 | | ∞ | 4.55807 | | 21.63 |

Symbol Description a - Polynomial asphere
c - Conic section

TABLE 1A-continued

Conics

| Surface Number | Constant |
|---|---|
| 2 | −8.7623E−01 |

Even Polynomial Aspheres

| Surf. No. | D | E | F | G | H | I |
|---|---|---|---|---|---|---|
| 1 | −7.8434E−07 | 1.7523E−08 | −5.8084E−11 | 4.4903E−14 | 5.0784E−17 | −7.2011E−20 |
| 2 | 3.1184E−05 | 8.6569E−09 | 1.7167E−09 | −7.3921E−12 | 5.7015E−15 | 2.6858E−17 |
| 12 | 2.3951E−06 | 1.1099E−08 | 1.6764E−10 | 1.2859E−13 | −1.5123E−15 | −1.8927E−18 |
| 13 | 2.0975E−05 | 4.4000E−08 | −6.6749E−11 | 1.1233E−12 | 2.1064E−17 | −1.2502E−17 |

First Order Data

| | | | |
|---|---|---|---|
| f/number | 2.75 | Overall Length | 1118.44 |
| Magnification | −0.0133 | Forward Vertex Distance | 124.277 |
| Object Height | −762.00 | Barrel Length | 119.719 |
| Object Distance | −994.165 | Entrance Pupil Distance | 19.6973 |
| Effective Focal Length | 13.4862 | Exit Pupil Distance | 1317.06 |
| Image Distance | 4.55807 | Stop Diameter | 10.159 |
| Stop Surface Number | 6 | Distance to Stop | 0.00 |

First Order Properties of Elements

| Element Number | Surface Numbers | | Power | f′ |
|---|---|---|---|---|
| 1 | 1 | 2 | −0.36784E−01 | −27.186 |
| 2 | 3 | 4 | −0.25618E−01 | −39.036 |
| 3 | 4 | 5 | 0.35546E−01 | 28.133 |
| 4 | 7 | 8 | 0.28758E−01 | 34.773 |
| 5 | 8 | 9 | −0.25576E−01 | −39.099 |
| 6 | 10 | 11 | 0.25203E−01 | 39.678 |
| 7 | 12 | 13 | 0.99007E−02 | 101.00 |

First-Order Properties of Doublets

| Element Numbers | | Surface Numbers | | Power | f′ |
|---|---|---|---|---|---|
| 2 | 3 | 3 | 5 | 0.11763E−01 | 85.014 |
| 4 | 5 | 7 | 9 | 0.23996E−02 | 416.74 |

Glass Table

| Elem. | Glass | Catalog | $n_d$ | $V_d$ | Q | $f/f_0$ |
|---|---|---|---|---|---|---|
| 1 | ACRYLIC | PLASTICS | 1.491738 | 57.4 | 120.0 | −2.02 |
| 2 | S-FPL51 | OHARA | 1.496999 | 81.5 | 120.0 | −2.89 |
| 3 | S-LAH60 | OHARA | 1.834000 | 37.2 | −34.0 | 2.09 |
| 4 | S-FPL51 | OHARA | 1.496999 | 81.5 | 120.0 | 2.58 |
| 5 | S-TIH4 | OHARA | 1.755199 | 27.5 | 46.0 | −2.90 |
| 6 | S-FPLS1 | OHARA | 1.496999 | 81.5 | 120.0 | 2.94 |
| 7 | ACRYLIC | PLASTICS | 1.491738 | 57.4 | 120.0 | 7.49 |

TABLE 1B

| Surf. No. | Type | Radius | Thickness | Glass | Clear Aperture Diameter |
|---|---|---|---|---|---|
| 1 | a | 103.6090 | 3.32000 | ACRYLIC | 35.51 |
| 2 | ac | 11.1107 | 18.27333 | | 25.26 |
| 3 | | −46.8988 | 1.66000 | S-FPL51 | 22.34 |
| 4 | | 72.0284 | 5.39500 | LAF7 | 22.13 |
| 5 | | −39.0089 | 16.24558 | | 21.86 |
| 6 | | Aperture stop | 16.96362 | | 10.15 |
| 7 | | ∞ | 7.88500 | FC5 | 22.28 |
| 8 | | −17.2589 | 1.66000 | FD6 | 23.78 |
| 9 | | −46.1508 | 0.41500 | | 26.85 |
| 10 | | 67.5491 | 8.30000 | BACD5 | 30.01 |
| 11 | | −32.1168 | 0.41500 | | 30.74 |

TABLE 1B-continued

| | | | | | |
|---|---|---|---|---|---|
| 12 | | −332.0000 | 4.98000 | ACRYLIC | 29.89 |
| 13 | a | −43.6995 | 5.00249 | | 29.49 |
| 14 | | ∞ | 30.00000 | BSC7 | 27.58 |
| 15 | | ∞ | 2.75000 | SIO2 | 22.00 |
| 16 | | ∞ | 4.36043 | | 21.47 |

Symbol Description a - Polynomial asphere
c - Conic section

Conics

| Surface Number | Constant |
|---|---|
| 2 | −8.7623E−01 |

Even Polynomial Aspheres

| Surf. No. | D | E | F | G | H | I |
|---|---|---|---|---|---|---|
| 1 | 7.6176E−07 | 1.0942E−08 | −7.0780E−11 | 5.5932E−14 | 1.0626E−16 | −5.0397E−20 |
| 2 | 2.2483E−05 | −2.9910E−08 | 1.5696E−09 | −7.5487E−12 | −1.3617E−14 | 1.0615E−16 |
| 13 | 1.5668E−05 | 2.0198E−08 | −1.4769E−10 | 6.7756E−13 | −1.4567E−15 | 1.7726E−18 |

First Order Data

| | | | |
|---|---|---|---|
| f/number | 3.00 | Overall Length | 1118.49 |
| Magnification | −0.0133 | Forward Vertex Distance | 127.625 |
| Object Height | −762.00 | Barrel Length | 123.265 |
| Object Distance | −990.865 | Entrance Pupil Distance | 18.3005 |
| Effective Focal Length | 13.4230 | Exit Pupil Distance | 2167.68 |
| Image Distance | 4.36043 | Stop Diameter | 9.675 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.39044E−01 | −25.612 |
| 2 | 3 | 4 | −0.17578E−01 | −56.888 |
| 3 | 4 | 5 | 0.29003E−01 | 34.480 |
| 4 | 7 | 8 | 0.28246E−01 | 35.404 |
| 5 | 8 | 9 | −0.28458E−01 | −35.140 |
| 6 | 10 | 11 | 0.26229E−01 | 38.125 |
| 7 | 12 | 13 | 0.98272E−02 | 101.76 |

First-Order Properties of Doublets

| Element Numbers | | Surface Numbers | | Power | f' |
|---|---|---|---|---|---|
| 2 | 3 | 3 | 5 | 0.12806E−01 | 78.086 |
| 4 | 5 | 7 | 9 | −0.66544E−03 | −1502.8 |

Glass Table

| Elem. | Glass | Catalog | $n_d$ | $V_d$ | Q | $f/f_o$ |
|---|---|---|---|---|---|---|
| 1 | ACRYLIC | PLASTICS | 1.491738 | 57.4 | 120.0 | −1.91 |
| 2 | S-FPL51 | OHARA | 1.496999 | 81.5 | 120.0 | −4.24 |
| 3 | LAF7 | HOYA | 1.749497 | 35.0 | −32.0 | 2.57 |
| 4 | FC5 | HOYA | 1.487490 | 70.4 | 13.0 | 2.64 |
| 5 | FD6 | HOYA | 1.805184 | 25.5 | 48.0 | −2.62 |
| 6 | BACD5 | HOYA | 1.589129 | 61.3 | −3.3 | 2.84 |
| 7 | ACRYLIC | PLASTICS | 1.491738 | 57.4 | 120.0 | 7.58 |

TABLE 1C

| Surf. No. | Type | Radius | Thickness | Glass | Clear Aperture Diameter |
|---|---|---|---|---|---|
| 1 | a | 130.7027 | 3.32000 | ACRYLIC | 34.99 |
| 2 | ac | 10.9287 | 18.25812 | | 25.01 |

TABLE 1C-continued

| | | | | |
|---|---|---|---|---|
| 3 | | −54.7993 | 1.66000 | S-FPL51 | 22.25 |
| 4 | | 78.0558 | 5.39500 | LAF7 | 22.04 |
| 5 | | −39.6992 | 16.00627 | | 21.75 |
| 6 | | Aperture stop | 16.66916 | | 10.32 |
| 7 | | −1557.5450 | 7.88500 | S-FPL51 | 22.07 |
| 8 | | −20.3147 | 1.66000 | FD6 | 23.96 |
| 9 | | −49.6442 | 0.41500 | | 26.34 |
| 10 | | 55.6114 | 8.30000 | S-FPL51 | 29.20 |
| 11 | | −34.2137 | 0.41500 | | 29.90 |
| 12 | | 1158.2491 | 4.98000 | ACRYLIC | 29.43 |
| 13 | a | −43.3343 | 4.88391 | | 29.15 |
| 14 | | ∞ | 30.00000 | BSC7 | 27.33 |
| 15 | | ∞ | 2.75000 | SIO2 | 21.93 |
| 16 | | ∞ | 4.35566 | | 21.41 |

Symbol Description a - Polynomial asphere
c - Conic section

Conics

| Surface Number | Constant |
|---|---|
| 2 | −8.7623E−01 |

Even Polynomial Aspheres

| Surf. No. | D | E | F | G | H | I |
|---|---|---|---|---|---|---|
| 1 | 6.8149E−07 | 1.1190E−08 | −7.1594E−11 | 5.3469E−14 | 1.0217E−16 | −6.2815E−20 |
| 2 | 1.9588E−05 | −3.3366E−08 | 1.6125E−09 | −7.7623E−12 | −1.5088E−14 | 9.8917E−17 |
| 13 | 1.5546E−05 | 2.0202E−08 | −1.6352E−10 | 6.8030E−13 | −1.2036E−15 | 8.9310E−19 |

First Order Data

| | | | |
|---|---|---|---|
| f/number | 3.00 | Overall Length | 1118.39 |
| Magnification | −0.0133 | Forward Vertex Distance | 126.953 |
| Object Height | −762.00 | Barrel Length | 122.597 |
| Object Distance | −991.436 | Entrance Pupil Distance | 17.8249 |
| Effective Focal Length | 13.4226 | Exit Pupil Distance | −4205.55 |
| Image Distance | 4.35566 | Stop Diameter | 9.808 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.40856E−01 | −24.476 |
| 2 | 3 | 4 | −0.15501E−01 | −64.513 |
| 3 | 4 | 5 | 0.27922E−01 | 35.813 |
| 4 | 7 | 8 | 0.24187E−01 | 41.344 |
| 5 | 8 | 9 | −0.22825E−01 | −43.811 |
| 6 | 10 | 11 | 0.22744E−01 | 43.969 |
| 7 | 12 | 13 | 0.11756E−01 | 85.063 |

First-Order Properties of Doublets

| Element Numbers | | Surface Numbers | | Power | f' |
|---|---|---|---|---|---|
| 2 | 3 | 3 | 5 | 0.13605E−01 | 73.502 |
| 4 | 5 | 7 | 9 | 0.96261E−03 | 1038.8 |

Glass Table

| Elem. | Glass | Catalog | $n_d$ | $V_d$ | Q | $f/f_0$ |
|---|---|---|---|---|---|---|
| 1 | ACRYLIC | PLASTICS | 1.491738 | 57.4 | 120.0 | −1.82 |
| 2 | S-FPL51 | OHARA | 1.496999 | 81.5 | 120.0 | −4.81 |
| 3 | LAF7 | HOYA | 1.749497 | 35.0 | −32.0 | 2.67 |
| 4 | S-FPL51 | OHARA | 1.496999 | 81.5 | 120.0 | 3.08 |
| 5 | FD6 | HOYA | 1.805184 | 25.5 | 48.0 | −3.26 |
| 6 | S-FPL51 | OHARA | 1.496999 | 81.5 | 120.0 | 3.28 |
| 7 | ACRYLIC | PLASTICS | 1.491738 | 57.4 | 120.0 | 6.34 |

TABLE 1D

| Surf. No. | Type | Radius | Thickness | Glass | Clear Aperture Diameter |
|---|---|---|---|---|---|
| 1 | a | 77.4529 | 3.32000 | COC | 34.48 |
| 2 | ac | 11.2265 | 17.52400 | | 24.89 |
| 3 | | −100.0278 | 1.66000 | LAC8 | 21.81 |
| 4 | | 46.2601 | 5.39500 | FD15 | 21.45 |
| 5 | | −37.3085 | 15.90334 | | 21.19 |
| 6 | | Aperture stop | 16.77422 | | 10.12 |
| 7 | | ∞ | 7.88500 | FC5 | 22.33 |
| 8 | | −17.4982 | 1.66000 | FD6 | 23.86 |
| 9 | | −46.0327 | 0.41500 | | 26.89 |
| 10 | | 70.7374 | 8.30000 | BACD5 | 29.97 |
| 11 | | −31.5287 | 0.41500 | | 30.71 |
| 12 | | −419.6868 | 4.98000 | ACRYLIC | 29.82 |
| 13 | a | −46.9933 | 5.57933 | | 29.38 |
| 14 | | ∞ | 30.00000 | BSC7 | 27.45 |
| 15 | | ∞ | 2.75000 | SIO2 | 22.11 |
| 16 | | ∞ | 5.02074 | | 21.61 |

Symbol Description a - Polynomial asphere
c - Conic section
Conics

| Surface Number | Constant |
|---|---|
| 2 | −8.7623E−01 |

Even Polynomial Aspheres

| Surf. No. | D | E | F | G | H | I |
|---|---|---|---|---|---|---|
| 1 | −4.1055E−08 | 7.5201E−09 | −7.4178E−11 | 6.4778E−14 | 1.4525E−16 | −3.8985E−20 |
| 2 | 2.4287E−05 | −3.8037E−08 | 1.4486E−09 | −8.1959E−12 | −1.4643E−14 | 1.3569E−16 |
| 13 | 1.4875E−05 | 2.2348E−08 | −1.4883E−10 | 6.6828E−13 | −1.4400E−15 | 1.9154E−18 |

First Order Data

| | | | |
|---|---|---|---|
| f/number | 3.00 | Overall Length | 1118.24 |
| Magnification | −0.0133 | Forward Vertex Distance | 127.582 |
| Object Height | −762.00 | Barrel Length | 122.561 |
| Object Distance | −990.661 | Entrance Pupil Distance | 17.9096 |
| Effective Focal Length | 13.4139 | Exit Pupil Distance | −24282.3 |
| Image Distance | 5.02074 | Stop Diameter | 9.766 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.39910E−01 | −25.056 |
| 2 | 3 | 4 | −0.22647E−01 | −44.156 |
| 3 | 4 | 5 | 0.32944E−01 | 30.354 |
| 4 | 7 | 8 | 0.27859E−01 | 35.895 |
| 5 | 8 | 9 | −0.27783E−01 | −35.993 |
| 6 | 10 | 11 | 0.26201E−01 | 38.166 |
| 7 | 12 | 13 | 0.93332E−02 | 107.14 |

First-Order Properties of Doublets

| Element Numbers | | Surface Numbers | | Power | f' |
|---|---|---|---|---|---|
| 2 | 3 | 3 | 5 | 0.11872E−01 | 84.233 |
| 4 | 5 | 7 | 9 | −0.37209E−03 | −2687.5 |

Glass Table

| Elem. | Glass | Catalog | $n_d$ | $V_d$ | Q | $f/f_0$ |
|---|---|---|---|---|---|---|
| 1 | COC | PLASTICS | 1.533300 | 56.2 | 150.0 | −1.87 |
| 2 | LAC8 | HOYA | 1.712997 | 53.9 | −40.0 | −3.29 |
| 3 | FD15 | HOYA | 1.698941 | 30.0 | 30.0 | 2.26 |
| 4 | FC5 | HOYA | 1.487488 | 70.4 | 13.0 | 2.68 |

TABLE 1D-continued

| 5 | FD6 | HOYA | 1.805178 | 25.5 | 48.0 | −2.68 |
| 6 | BACD5 | HOYA | 1.589127 | 61.3 | −3.3 | 2.85 |
| 7 | ACRYLIC | PLASTICS | 1.491736 | 57.4 | 120.0 | 7.99 |

TABLE 1E

| Surf. No. | Type | Radius | Thickness | Glass | Clear Aperture Diameter |
|---|---|---|---|---|---|
| 1 | a | 76.8525 | 3.32000 | ACRYLIC | 33.16 |
| 2 | ac | 11.5697 | 19.57361 | | 23.72 |
| 3 | | −50.1666 | 1.66000 | TAF1 | 17.91 |
| 4 | | 25.1662 | 5.39500 | FD8 | 17.70 |
| 5 | | −32.4216 | 16.81906 | | 17.65 |
| 6 | | Aperture stop | 17.81341 | | 11.14 |
| 7 | | 2898.2890 | 7.88500 | S-FPL53 | 22.83 |
| 8 | | −17.8509 | 1.66000 | NBFD15 | 24.32 |
| 9 | | −44.3692 | 0.41500 | | 27.44 |
| 10 | | 67.9928 | 8.30000 | S-FPL53 | 30.92 |
| 11 | | −28.1136 | 0.41500 | | 31.53 |
| 12 | | 4802.4648 | 4.98000 | ACRYLIC | 31.25 |
| 13 | a | −39.5799 | 13.18499 | | 31.15 |
| 14 | | ∞ | 30.00000 | BSC7 | 27.12 |
| 15 | | ∞ | 2.75000 | SIO2 | 22.03 |
| 16 | | ∞ | 5.02004 | | 21.54 |

Symbol Description a - Polynomial asphere
c - Conic section
Conics

| Surface Number | Constant |
|---|---|
| 2 | −8.7623E−01 |

Even Polynomial Aspheres

| Surf. No. | D | E | F | G | H | I |
|---|---|---|---|---|---|---|
| 1 | 2.4193E−06 | 1.6999E−08 | −6.6477E−11 | 2.8634E−14 | −6.2845E−18 | 2.3440E−19 |
| 2 | 2.5202E−05 | −1.8176E−08 | 1.6793E−09 | −5.9882E−12 | −8.5168E−15 | 5.7833E−17 |
| 13 | 1.2319E−05 | 1.7274E−08 | −1.3959E−10 | 6.8649E−13 | −1.5802E−15 | 1.6450E−18 |

First Order Data

| | | | |
|---|---|---|---|
| f/number | 3.00 | Overall Length | 1118.68 |
| Magnification | −0.0133 | Forward Vertex Distance | 139.191 |
| Object Height | −762.00 | Barrel Length | 134.171 |
| Object Distance | −979.493 | Entrance Pupil Distance | 18.9477 |
| Effective Focal Length | 13.2791 | Exit Pupil Distance | −11308.2 |
| Image Distance | 5.02004 | Stop Diameter | 10.628 |
| Stop Surface Number | 6 | Distance to Stop | 0.00 |

First Order Properties of Elements

| Element Number | Surface Numbers | | Power | f |
|---|---|---|---|---|
| 1 | 1 | 2 | −0.35499E−01 | −28.170 |
| 2 | 3 | 4 | −0.46537E−01 | −21.488 |
| 3 | 4 | 5 | 0.46766E−01 | 21.383 |
| 4 | 7 | 8 | 0.24710E−01 | 40.470 |
| 5 | 8 | 9 | −0.26235E−01 | −38.117 |
| 6 | 10 | 11 | 0.21478E−01 | 46.559 |
| 7 | 12 | 13 | 0.12522E−01 | 79.859 |

TABLE 1E-continued

First-Order Properties of Doublets

| | Element Numbers | | Surface Numbers | Power | f' |
|---|---|---|---|---|---|
| 2 | 3 | 3 | 5 | 0.40621E−02 | 246.18 |
| 4 | 5 | 7 | 9 | −0.19165E−02 | −521.77 |

Glass Table

| Elem. | Glass | Catalog | $n_d$ | $V_d$ | Q | $f/f_0$ |
|---|---|---|---|---|---|---|
| 1 | ACRYLIC | PLASTICS | 1.491738 | 57.4 | 120.0 | −2.12 |
| 2 | TAF1 | HOYA | 1.772500 | 49.6 | −44.0 | −1.62 |
| 3 | FD8 | HOYA | 1.688931 | 31.2 | 2.7 | 1.61 |
| 4 | S-FPL53 | OHARA | 1.438750 | 95.0 | 160.0 | 3.05 |
| 5 | NBFD15 | HOYA | 1.806100 | 33.3 | −11.0 | −2.87 |
| 6 | S-FPL53 | OHARA | 1.438750 | 95.& | 160.0 | 3.51 |
| 7 | ACRYLIC | PLASTICS | 1.491738 | 57.4 | 120.0 | 6.01 |

TABLE 1F

| Surf. No. | Type | Radius | Thickness | Glass | Clear Aperture Diameter |
|---|---|---|---|---|---|
| 1 | a | 93.5739 | 3.32000 | ACRYLIC | 35.12 |
| 2 | ac | 10.9890 | 17.65325 | | 25.03 |
| 3 | | −92.4844 | 1.66000 | LAC8 | 21.92 |
| 4 | | 50.9108 | 5.39500 | FD15 | 21.58 |
| 5 | | −37.1377 | 15.97087 | | 21.32 |
| 6 | | Aperture stop | 16.67433 | | 10.12 |
| 7 | | ∞ | 7.88500 | FC5 | 22.29 |
| 8 | | −17.5555 | 1.66000 | FD6 | 23.84 |
| 9 | | −46.0739 | 0.41500 | | 26.85 |
| 10 | | 71.5714 | 8.30000 | BACD5 | 29.90 |
| 11 | | −31.6450 | 0.41500 | | 30.67 |
| 12 | | −315.3373 | 4.98000 | COC | 29.85 |
| 13 | a | −47.4483 | 5.58566 | | 29.48 |
| 14 | | ∞ | 30.00000 | BSC7 | 27.51 |
| 15 | | ∞ | 2.75000 | SIO2 | 22.13 |
| 16 | | ∞ | 5.01569 | | 21.62 |

Symbol Description a - Polynomial asphere
c - Conic section

Conics

| Surface Number | Constant |
|---|---|
| 2 | −8.7623E−01 |

Even Polynomial Aspheres

| Surf. No. | D | E | F | G | H | I |
|---|---|---|---|---|---|---|
| 1 | 1.8835E−07 | 8.6676E−09 | −7.2453E−11 | 6.4925E−14 | 1.3523E−16 | −8.8201E−20 |
| 2 | 2.4575E−05 | −3.7278E−08 | 1.5002E−09 | −7.8715E−12 | −1.4516E−14 | 1.2247E−16 |
| 13 | 1.3615E−05 | 2.0730E−08 | −1.4448E−10 | 6.7018E−13 | −1.5230E−15 | 1.9444E−18 |

First Order Data

| | | | | |
|---|---|---|---|---|
| f/number | 3.00 | Overall Length | | 1118.44 |
| Magnification | −0.0133 | Forward Vertex Distance | | 127.680 |
| Object Height | −762.00 | Barrel Length | | 122.664 |
| Object Distance | −990.756 | Entrance Pupil Distance | | 18.1203 |
| Effective Focal Length | 13.4181 | Exit Pupil Distance | | 55457.5 |
| Image Distance | 5.01569 | Stop Diameter | | 9.728 |
| Stop Surface Number | 6 | Distance to Stop | | 0.00 |

TABLE 1F-continued

First Order Properties of Elements

| Element Number | Surface Numbers | | Power | f |
|---|---|---|---|---|
| 1 | 1 | 2 | −0.38970E−01 | −25.661 |
| 2 | 3 | 4 | −0.21819E−01 | −45.832 |
| 3 | 4 | 5 | 0.31728E−01 | 31.517 |
| 4 | 7 | 8 | 0.27768E−01 | 36.012 |
| 5 | 8 | 9 | −0.27652E−01 | −36.164 |
| 6 | 10 | 11 | 0.26048E−01 | 38.391 |
| 7 | 12 | 13 | 0.96101E−02 | 104.06 |

First-Order Properties of Doublets

| Element Numbers | | Surface Numbers | | Power | f |
|---|---|---|---|---|---|
| 2 | 3 | 3 | 5 | 0.11451E−01 | 87.331 |
| 4 | 5 | 7 | 9 | −0.32974E−03 | −3032.7 |

Glass Table

| Elem. | Glass | Catalog | $n_d$ | $V_d$ | Q | $f/f_o$ |
|---|---|---|---|---|---|---|
| 1 | ACRYLIC | PLASTICS | 1.491736 | 57.4 | 120.0 | −1.91 |
| 3 | LAC8 | HOYA | 1.712997 | 53.9 | −40.0 | −3.42 |
| 4 | FD15 | HOYA | 1.698941 | 30.0 | 30.0 | 2.35 |
| 7 | FC5 | HOYA | 1.487488 | 70.4 | 13.0 | 2.68 |
| 8 | FD6 | HOYA | 1.805178 | 25.5 | 48.0 | −2.70 |
| 10 | HACD5 | HOYA | 1.589127 | 61.3 | −3.3 | 2.86 |
| 12 | COC | PLASTICS | 1.533300 | 56.2 | 150.0 | 7.76 |

TABLE 1G

| Surf. No. | Type | Radius | Thickness | Glass | Clear Aperture Diameter |
|---|---|---|---|---|---|
| 1 | a | 76.6089 | 3.32000 | COC | 34.54 |
| 2 | ac | 11.2724 | 17.48853 | | 24.94 |
| 3 | | −98.8496 | 1.66000 | LAC8 | 21.82 |
| 4 | | 45.3051 | 5.39500 | FD15 | 21.45 |
| 5 | | −37.2860 | 15.89351 | | 21.20 |
| 6 | | Aperture stop | 16.80939 | | 10.11 |
| 7 | | ∞ | 7.88500 | FC5 | 22.35 |
| 8 | | −17.4743 | 1.66000 | FD6 | 23.88 |
| 9 | | −46.0510 | 0.41500 | | 26.92 |
| 10 | | 70.2170 | 8.30000 | BACD5 | 30.03 |
| 11 | | −31.4670 | 0.41500 | | 30.77 |
| 12 | | −366.8816 | 4.98000 | COC | 29.87 |
| 13 | a | −49.4824 | 5.54915 | | 29.44 |
| 14 | | ∞ | 30.00000 | BSC7 | 27.51 |
| 15 | | ∞ | 2.75000 | SIO2 | 22.13 |
| 16 | | ∞ | 5.01802 | | 21.62 |

Symbol Description a - Polynomial asphere
c - Conic section

Conics

| Surface Number | Constant |
|---|---|
| 2 | −8.7623E−01 |

Even Polynomial Aspheres

| Surf. No. | D | E | F | G | H | I |
|---|---|---|---|---|---|---|
| 1 | 1.8386E−07 | 7.8317E−09 | −7.4925E−11 | 6.3331E−14 | 1.4726E−16 | −4.7105E−20 |
| 2 | 2.4794E−05 | −3.6540E−08 | 1.4596E−09 | −8.1096E−12 | −1.4567E−14 | 1.3092E−16 |
| 13 | 1.3549E−05 | 2.1636E−08 | −1.4773E−10 | 6.7442E−13 | −1.4352E−15 | 1.7667E−18 |

TABLE 1G-continued

First Order Data

| | | | |
|---|---|---|---|
| f/number | 3.00 | Overall Length | 1118.08 |
| Magnification | −0.0133 | Forward Vertex Distance | 127.539 |
| Object Height | −762.00 | Barrel Length | 122.521 |
| Object Distance | −990.544 | Entrance Pupil Distance | 17.9667 |
| Effective Focal Length | 43.4134 | Exit Pupil Distance | 10215.2 |
| Image Distance | 5.01802 | Stop Diameter | 9.728 |
| Stop Surface Number | 6 | Distance to Stop | 0.00 |

First Order Properties of Elements

| Element Number | | Surface Numbers | Power | f |
|---|---|---|---|---|
| 1 | 1 | 2 | −0.39636E−01 | −25.230 |
| 2 | 3 | 4 | −0.23061E−01 | −43.364 |
| 3 | 4 | 5 | 0.33255E−01 | 30.071 |
| 4 | 7 | 8 | 0.27898E−01 | 35.845 |
| 5 | 8 | 9 | −0.27853E−01 | −35.903 |
| 6 | 10 | 11 | 0.26292E−01 | 38.035 |
| 7 | 12 | 13 | 0.93749E−02 | 106.67 |

First-Order Properties of Doublets

| | Element Numbers | | Surface Numbers | Power | f |
|---|---|---|---|---|---|
| 2 | 3 | 3 | 5 | 0.11799E−01 | 84.752 |
| 4 | 5 | 7 | 9 | −0.40378E−03 | −2476.6 |

Glass Table

| Elem. | Glass | Catalog | $n_d$ | $V_d$ | Q | $f/f_o$ |
|---|---|---|---|---|---|---|
| 1 | COC | PLASTICS | 1.533302 | 56.2 | 150.0 | −1.88 |
| 2 | LAC8 | HOYA | 1.713000 | 53.9 | −40.0 | −3.23 |
| 3 | FD15 | HOYA | 1.698945 | 30.1 | 30.0 | 2.24 |
| 4 | FC5 | HOYA | 1.487490 | 70.4 | 13.0 | 2.67 |
| 5 | FD6 | HOYA | 1.805184 | 25.5 | 48.0 | −2.68 |
| 6 | BACD5 | HOYA | 1.589129 | 61.3 | −3.3 | 2.84 |
| 7 | COC | PLASTICS | 1.533302 | 56.2 | 150.0 | 7.95 |

TABLE 1H

| Surf. No. | Type | Radius | Thickness | Glass | Clear Aperture Diameter |
|---|---|---|---|---|---|
| 1 | a | 88.3121 | 3.32000 | ACRYLIC | 35.20 |
| 2 | ac | 10.9340 | 17.71330 | | 25.10 |
| 3 | | −90.1977 | 1.66000 | LAC8 | 22.02 |
| 4 | | 55.5315 | 5.39500 | FD15 | 21.69 |
| 5 | | −36.9749 | 16.02150 | | 21.44 |
| 6 | | Aperture stop | 16.75151 | | 10.06 |
| 7 | | ∞ | 7.88500 | FC5 | 22.33 |
| 8 | | −17.4485 | 1.66000 | FD6 | 23.86 |
| 9 | | −45.6537 | 0.41500 | | 26.89 |
| 10 | | 73.8137 | 8.30000 | BACD5 | 29.94 |
| 11 | | −31.7233 | 0.41500 | | 30.73 |
| 12 | | −332.0000 | 4.98000 | ACRYLIC | 29.95 |
| 13 | a | −43.6995 | 5.55400 | | 29.59 |
| 14 | | ∞ | 30.00000 | BSC7 | 27.57 |
| 15 | | ∞ | 2.75000 | SIO2 | 22.14 |
| 16 | | ∞ | 5.01303 | | 21.62 |

Symbol Description a - Polynomial asphere
c - Conic section

Conics

| Surface Number | Constant |
|---|---|
| 2 | −8.7623E−01 |

TABLE 1H-continued

Even Polynomial Aspheres

| Surf. No. | D | E | F | G | H | I |
|---|---|---|---|---|---|---|
| 1 | −3.5930E−07 | 8.2239E−09 | −7.0588E−11 | 7.1058E−14 | 1.3597E−16 | −1.5686E−19 |
| 2 | 2.4857E−05 | −4.0707E−08 | 1.4840E−09 | −7.8653E−12 | −1.4656E−14 | 1.2211E−16 |
| 13 | 1.4517E−05 | 2.2248E−08 | −1.3968E−10 | 6.5242E−13 | −1.6562E−15 | 2.2768E−18 |

First Order Data

| | | | |
|---|---|---|---|
| f/number | 3.00 | Overall Length | 1117.70 |
| Magnification | −0.0133 | Forward Vertex Distance | 127.833 |
| Object Height | −762.00 | Barrel Length | 122.820 |
| Object Distance | −989.871 | Entrance Pupil Distance | 18.1793 |
| Effective Focal Length | 13.4075 | Exit Pupil Distance | 6234.75 |
| Image Distance | 5.01303 | Stop Diameter | 9.726 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.38848E−01 | −25.742 |
| 2 | 3 | 4 | −0.20843E−01 | −47.978 |
| 3 | 4 | 5 | 0.30734E−01 | 32.537 |
| 4 | 7 | 8 | 0.27939E−01 | 35.793 |
| 5 | 8 | 9 | −0.27761E−01 | −36.022 |
| 6 | 10 | 11 | 0.25778E−01 | 38.793 |
| 7 | 12 | 13 | 0.98272E−02 | 101.76 |

First-Order Properties of Doublets

| Element Numbers | | Surface Numbers | | Power | f' |
|---|---|---|---|---|---|
| 2 | 3 | 3 | 5 | 0.11378E−01 | 87.889 |
| 4 | 5 | 7 | 9 | −0.27550E−03 | −3629.8 |

Glass Table

| Elem. | Glass | Catalog | $n_d$ | $V_d$ | Q | $f/f_o$ |
|---|---|---|---|---|---|---|
| 1 | ACRYLIC | PLASTICS | 1.491738 | 57.4 | 120.0 | −1.92 |
| 2 | LAC8 | HOYA | 1.713000 | 53.9 | −40.0 | −3.58 |
| 3 | FD15 | HOYA | 1.698945 | 30.1 | 30.0 | 2.43 |
| 4 | FC5 | HOYA | 1.487490 | 70.4 | 13.0 | 2.67 |
| 5 | FD6 | HOYA | 1.805184 | 25.5 | 48.0 | −2.69 |
| 6 | BACD5 | HOYA | 1.589129 | 61.3 | −3.3 | 2.89 |
| 7 | ACRYLIC | PLASTICS | 1.491738 | 57.4 | 120.0 | 7.59 |

TABLE 2A

| Surf. No. | Type | Radius | Thickness | Glass | Clear Aperture Diameter |
|---|---|---|---|---|---|
| 1 | a | −186.0847 | 3.00000 | ACRYLIC | 25.57 |
| 2 | ac | 11.2883 | 15.69341 | | 17.57 |
| 3 | | −271.4427 | 1.50000 | FCD1 | 11.89 |
| 4 | | 9.5378 | 4.00000 | FF5 | 10.79 |
| 5 | | −456.3765 | 8.34007 | | 9.87 |
| 6 | | Aperture stop | 10.75956 | | 5.14 |
| 7 | | −91.6778 | 9.00000 | S-FPL53 | 12.60 |
| 8 | | −10.0114 | 1.80000 | NBFD15 | 15.69 |
| 9 | | −23.3591 | 0.50000 | | 18.88 |
| 10 | | 61.9879 | 8.00O00 | FCS | 21.98 |
| 11 | | −19.0062 | 0.50000 | | 23.27 |
| 12 | | −131.7084 | 4.00000 | ACRYLIC | 22.91 |
| 13 | a | −36.0270 | 1.44958 | | 22.90 |
| 14 | | ∞ | 25.40000 | SF1 | 22.50 |
| 15 | | ∞ | 25.40000 | BK7 | 20.41 |
| 16 | | ∞ | 1.35000 | BK7 | 18.04 |
| 17 | | ∞ | −0.01237 | | 17.92 |

TABLE 2A-continued

Symbol Description a - Polynomial asphere
c - Conic section

Conics

| Surface Number | Constant |
|---|---|
| 2 | −1.6440E−01 |

Even Polynomial Aspheres

| Surf. No. | D | E | F | G | H | I |
|---|---|---|---|---|---|---|
| 1 | 1.8743E−04 | −1.0081E−06 | 1.1545E−09 | 1.1360E−11 | −4.0909E−14 | 4.4384E−17 |
| 2 | 1.7734E−04 | 1.3800E−06 | −9.4574E−09 | −1.9479E−10 | −8.2983E−13 | 3.1606E−14 |
| 13 | 2.2974E−0S | −9.6651E−09 | 4.4534E−10 | −9.3065E−13 | −8.7352E−15 | 6.8537E−17 |

First Order Data

| | | | |
|---|---|---|---|
| f/number | 5.00 | Overall Length | 618.125 |
| Magnification | −0.0235 | Forward Vertex Distance | 120.680 |
| Object Height | −381.00 | Barrel Length | 120.693 |
| Object Distance | −497.445 | Entrance Pupil Distance | 14.2058 |
| Effective Focal Length | 12.0272 | Exit Pupil Distance | −22731.4 |
| Image Distance | −.123740E−01 | Stop Diameter | 5.074 |
| Stop Surface Number | 6 | Distance to Stop | 0.00 |

First Order Properties of Elements

| Element Number | Surface Numbers | | Power | f |
|---|---|---|---|---|
| 1 | 1 | 2 | −0.46436E−01 | −21.535 |
| 2 | 3 | 4 | −0.54035E−01 | −18.507 |
| 3 | 4 | 5 | 0.63239E−01 | 15.813 |
| 4 | 7 | 8 | 0.40351E−01 | 24.782 |
| 5 | 8 | 9 | −0.43240E−01 | −23.127 |
| 6 | 10 | 11 | 0.32428E−01 | 30.837 |
| 7 | 12 | 13 | 0.10052E−01 | 99.480 |

First-Order Properties of Doublets

| | Element Numbers | | Surface Numbers | | Power | f |
|---|---|---|---|---|---|---|
| 2 | 3 | 3 | 5 | | 0.94962E−02 | 105.31 |
| 4 | 5 | 7 | 9 | | −0.55710E−02 | −179.50 |

Glass Table

| Elem. | Glass | Catalog | $n_d$ | $V_d$ | Q | $f/f_o$ |
|---|---|---|---|---|---|---|
| 1 | ACRYLIC | PLASTICS | 1.491738 | 57.4 | 120.0 | −1.79 |
| 2 | FCD1 | HOYA | 1.496997 | 81.6 | 120.0 | −1.54 |
| 3 | FF5 | HOYA | 1.592703 | 35.4 | 28.0 | 1.31 |
| 4 | S-FPL53 | OHARA | 1.438750 | 95.0 | 160.0 | 2.06 |
| 5 | NBFD15 | HOYA | 1.806100 | 33.3 | 11.0 | −1.92 |
| 6 | FC5 | HOYA | 1.487490 | 70.4 | 13.0 | 2.56 |
| 7 | ACRYLIC | PLASTICS | 1.491738 | 57.4 | 120.0 | 8.27 |

TABLE 2B

| Surf. No. | Type | Radius | Thickness | Glass | Clear Aperture Diameter |
|---|---|---|---|---|---|
| 1 | a | −373.3806 | 3.00000 | ACRYLIC | 26.71 |
| 2 | ac | 13.4329 | 13.61509 | | 18.79 |
| 3 | | −197.8296 | 1.50000 | LAC8 | 13.19 |
| 4 | | 13.0362 | 4.00000 | FD6 | 12.10 |
| 5 | | 147.1213 | 10.49557 | | 11.09 |
| 6 | | Aperture stop | 11.11013 | | 5.03 |
| 7 | | 330.3008 | 9.00000 | FCD1 | 13.59 |
| 8 | | −9.6915 | 1.80000 | NBFD15 | 15.99 |

TABLE 2B-continued

| | | | | | |
|---|---|---|---|---|---|
| 9 | | −24.8691 | 0.50000 | | 19.34 |
| 10 | | 307.3694 | 8.00000 | CF6 | 21.50 |
| 11 | | −17.8236 | 0.50000 | | 23.20 |
| 12 | | −91.4836 | 4.00000 | ACRYLIC | 22.78 |
| 13 | a | −36.8932 | 2.52287 | | 22.82 |
| 14 | | ∞ | 25.40000 | SF1 | 22.29 |
| 15 | | ∞ | 25.40000 | BK7 | 20.30 |
| 16 | | ∞ | 1.35000 | BK7 | 18.04 |
| 17 | | ∞ | −0.00123 | | 17.92 |

Symbol Description a - Polynomial asphere
c - Conic section

Conics

Surface
Number  Constant

2       −1.6440E−01

Even Polynomial Aspheres

| Surf. No. | D | E | F | G | H | I |
|---|---|---|---|---|---|---|
| 1 | 1.7194E−04 | −7.5475E−07 | 2.1301E−10 | 1.0133E−11 | −2.7500E−14 | 2.1094E−17 |
| 2 | 1.6679E−04 | 1.6614E−06 | −1.7644E−08 | −6.5292E−11 | 4.4482E−13 | 7.6509E−15 |
| 13 | 2.0353E−05 | −6.3420E−09 | 4.0020E−10 | −1.3029E−12 | −4.9655E−15 | 5.6123E−17 |

First Order Data

| | | | |
|---|---|---|---|
| f/number | 5.00 | Overall Length | 618.000 |
| Magnification | −0.0235 | Forward Vertex Distance | 122.192 |
| Object Height | −381.00 | Barrel Length | 122.194 |
| Object Distance | −495.807 | Entrance Pupil Distance | 15.2741 |
| Effective Focal Length | 12.0137 | Exit Pupil Distance | −11317.2 |
| Image Distance | −.122983E−02 | Stop Diameter | 4.962 |
| Stop Surface Number | 6 | Distance to Stop | 0.00 |

First Order Properties of Elements

| Element Number | Surface Numbers | | Power | f' |
|---|---|---|---|---|
| 1 | 1 | 2 | −0.38179E−01 | −26.193 |
| 2 | 3 | 4 | −0.58729E−01 | −17.027 |
| 3 | 4 | 5 | 0.57573E−01 | 17.369 |
| 4 | 7 | 8 | 0.52475E−01 | 19.057 |
| 5 | 8 | 9 | −0.48407E−01 | −20.658 |
| 6 | 10 | 11 | 0.30594E−01 | 32.686 |
| 7 | 12 | 13 | 0.81800E−02 | 122.25 |

First-Order Properties of Doublets

| Element Numbers | | Surface Numbers | | Power | f' |
|---|---|---|---|---|---|
| 2 | 3 | 3 | 5 | −0.16896E−02 | −591.86 |
| 4 | 5 | 7 | 9 | 0.28047E−02 | 356.54 |

Glass Table

| Elem. | Glass | Catalog | $n_d$ | $V_d$ | Q | $f/f_o$ |
|---|---|---|---|---|---|---|
| 1 | Acrylic | PLASTICS | 1.491738 | 57.4 | 120.0 | −2.14 |
| 2 | LAC8 | Hoya | 1.713000 | 53.9 | −40.0 | −1.40 |
| 3 | FD6 | Hoya | 1.805184 | 25.5 | 48.0 | 1.42 |
| 4 | FCD1 | Hoya | 1.496997 | 81.6 | 120.0 | 1.56 |
| 5 | NBFD15 | Hoya | 1.806100 | 33.3 | −11.0 | −1.69 |
| 6 | CF6 | Hoya | 1.517419 | 52.2 | −8.4 | 2.68 |
| 7 | Acrylic | Plastics | 1.491738 | 57.4 | 120.0 | 10.01 |

TABLE 3

| Surf. No. | Type | Radius | Thickness | Glass | Clear Aperture Diameter |
|---|---|---|---|---|---|
| 1 | a | 55.0000 | 6.00000 | ACRYLIC | 61.93 |
| 2 | ac | 17.7228 | 16.70218 | | 40.74 |
| 3 | a | 80.5325 | 5.00000 | ACRYLIC | 39.12 |
| 4 | a | 19.6134 | 10.74501 | | 33.07 |
| 5 | | −59.7073 | 2.00000 | S-FPL53 | 32.87 |
| 6 | | 40.1547 | 8.50000 | S-LAH66 | 33.27 |
| 7 | | −92.7858 | 0.50000 | | 32.82 |
| 8 | | 36.5520 | 4.50000 | NBFD10 | 30.03 |
| 9 | | 58.4439 | 17.93803 | | 27.98 |
| 10 | | Aperture stop | 16.16397 | | 16.63 |
| 11 | | −244.0248 | 10.00000 | S-FPL51 | 26.94 |
| 12 | | −18.4972 | 2.00000 | NBFD15 | 28.84 |
| 13 | | −69.9376 | 0.50000 | | 34.71 |
| 14 | | 73.9485 | 12.00000 | S-FPL51 | 41.58 |
| 15 | | −44.0735 | 0.50000 | | 43.15 |
| 16 | | 1435.0179 | 6.00000 | FC5 | 44.19 |
| 17 | | −111.9515 | 0.50000 | | 44.55 |
| 18 | c | 128.8048 | 8.00000 | ACRYLIC | 44.34 |
| 19 | a | −66.7794 | 5.55641 | | 43.95 |
| 20 | | ∞ | 40.00000 | 604638 | 41.40 |
| 21 | | ∞ | 2.00000 | BK7 | 34.56 |
| 22 | | ∞ | 5.01034 | | 34.19 |

Symbol Description a - Polynomial asphere
c - Conic section

Conics

| Surface Number | Constant |
|---|---|
| 2 | −7.1726E−01 |
| 18 | −6.4600E+01 |

Even Polynomial Aspheres

| Surf. No. | D | E | F | G | H | I |
|---|---|---|---|---|---|---|
| 1 | 2.3720E−06 | −4.1636E−09 | −3.3306E−12 | 1.6221E−14 | −1.6955E−17 | 5.7242E−21 |
| 2 | 1.1106E−05 | 1.7218E−08 | −1.4102E−11 | −1.4782E−13 | 1.0253E−15 | −9.9160E−19 |
| 3 | 4.5674E−06 | 1.5449E−10 | −3.5270E−13 | −1.5663E−14 | 4.6591E−18 | 4.2830E−20 |
| 4 | −8.5546E−06 | −1.5848E−08 | −1.3210E−10 | −4.2174E−14 | 5.4509E−16 | −2.0420E−18 |
| 19 | 1.2888E−06 | 1.3113E−08 | −3.9578E−11 | 9.0021E−14 | −1.0560E−16 | 5.2799E−20 |

First Order Data

| | | | |
|---|---|---|---|
| f/number | 2.40 | Overall Length | 1055.89 |
| Magnification | −0.0202 | Forward Vertex Distance | 180.116 |
| Object Height | −812.80 | Barrel Length | 175.106 |
| Object Distance | −875.778 | Entrance Pupil Distance | 31.5266 |
| Effective Focal Length | 18.3066 | Exit Pupil Distance | −2421.86 |
| Image Distance | 5.01034 | Stop Diameter | 15.990 |
| Stop Surface Number | 10 | Distance to Stop | 0.00 |

First Order Properties of Elements

| Element Number | Surface Numbers | | Power | f |
|---|---|---|---|---|
| 1 | 1 | 2 | −0.17808E−01 | −56.156 |
| 2 | 3 | 4 | −0.18452E−01 | −54.194 |
| 3 | 5 | 6 | −0.18386E−01 | −54.388 |
| 4 | 6 | 7 | 0.26796E−01 | 37.320 |
| 5 | 8 | 9 | 0.93456E−02 | 107.00 |
| 6 | 11 | 12 | 0.25198E−01 | 39.686 |
| 7 | 12 | 13 | −0.31497E−01 | −31.749 |
| 8 | 14 | 15 | 0.17390E−01 | 57.505 |
| 9 | 16 | 17 | 0.46882E−02 | 213.30 |
| 10 | 18 | 19 | 0.11031E−01 | 90.657 |

TABLE 3-continued

First-Order Properties of Doublets

| Element Numbers | | Surface Numbers | | Power | f' |
|---|---|---|---|---|---|
| 3 | 4 | 5 | 7 | 0.94169E−02 | 106.19 |
| 6 | 7 | 11 | 13 | −0.70497E−02 | −141.85 |

Glass Table

| Elem. | Glass | Catalog | $n_d$ | $V_d$ | Q | $f/f_0$ |
|---|---|---|---|---|---|---|
| 1 | ACRYLIC | PLASTICS | 1.491738 | 57.4 | 120.0 | −3.07 |
| 2 | ACRYLIC | PLASTICS | 1.491738 | 57.4 | 120.0 | −2.96 |
| 3 | S-FPL53 | OHARA | 1.438750 | 95.0 | 160.0 | −2.97 |
| 4 | S-LAH66 | OHARA | 1.772499 | 49.6 | −38.0 | 2.04 |
| 5 | NBFD10 | HOYA | 1.834001 | 37.3 | −18.0 | 5.84 |
| 6 | S-FPL51 | OHARA | 1.496999 | 81.5 | 120.0 | 2.17 |
| 7 | NBFD15 | HOYA | 1.806100 | 33.3 | −11.0 | −1.73 |
| 8 | S-FPL51 | OHARA | 1.496999 | 81.5 | 120.0 | 3.14 |
| 9 | FCS | HOYA | 1.487490 | 70.4 | 13.0 | 11.65 |
| 10 | ACRYLIC | PLASTICS | 1.491738 | 57.4 | 120.0 | 4.95 |

TABLE 4

| Surf. No. | Type | Radius | Thickness | Glass | Clear Aperture Diameter |
|---|---|---|---|---|---|
| 1 | a | 152.1157 | 8.00000 | 490573 | 101.00 |
| 2 | ac | 40.3060 | 86.02596 | | 78.00 |
| 3 | | ∞ | 11.00000 | | 40.50 |
| 4 | | −64.0652 | 3.30000 | FCD1 | 36.70 |
| 5 | | 120.4233 | 5.50000 | FD14 | 38.40 |
| 6 | | ∞ | Space 1 | | 39.20 |
| 7 | | 203.6135 | 3.40000 | TAF3 | 41.10 |
| 8 | | 33.1426 | 14.00000 | FD14 | 42.50 |
| 9 | | −106.0435 | 4.53801 | | 43.40 |
| 10 | | 278.2267 | 10.10000 | FCD1 | 43.90 |
| 11 | | −42.0110 | 3.90000 | FD4 | 43.90 |
| 12 | | −613.6439 | 6.70793 | | 45.80 |
| 13 | | −86.0046 | 4.30000 | FD4 | 47.00 |
| 14 | | 103.4014 | 10.80000 | FCD1 | 51.50 |
| 15 | | −103.4014 | 5.06806 | | 54.00 |
| 16 | | 352.9613 | 14.70000 | FCD1 | 61.00 |
| 17 | | −54.3360 | 1.15342 | | 62.40 |
| 18 | a | −503.5699 | 7.00000 | 490573 | 61.70 |
| 19 | | −138.3938 | Space 2 | | 61.90 |
| 20 | | ∞ | 92.00000 | FD10 | 60.00 |
| 21 | | ∞ | 1.00000 | | 50.00 |
| 22 | | ∞ | 59.00000 | BSC7 | 50.00 |
| 23 | | ∞ | 3.00000 | | 43.00 |
| 24 | | ∞ | 1.50000 | BSC7 | 43.00 |
| 25 | | ∞ | Image distance | | 43.00 |

Symbol Description a - Polynomial asphere
c - Conic section
Conics

| Surface Number | Constant |
|---|---|
| 2 | −6.0000E−01 |

Even Polynomial Aspheres

| Surf. No. | D | E | F | G | H | I |
|---|---|---|---|---|---|---|
| 1 | 3.8460E−07 | −1.2374E−10 | 3.6056E−15 | 4.1919E−18 | 1.7563E−21 | −4.8084E−25 |
| 2 | 4.6739E−07 | 7.7888E−11 | −1.0406E−13 | −7.5454E−17 | 6.6142E−20 | −9.7771E−26 |
| 18 | −5.0533E−07 | 1.8921E−11 | −5.8477E−14 | −1.3273E−17 | 5.2172E−20 | −2.4737E−23 |

TABLE 4-continued

Variable spaces

| Zoom Pos. | Space 1 T(6) | Space 2 T(19) | Focal Shift | Image Distance |
|---|---|---|---|---|
| 1 | 70.803 | 11.800 | 0.079 | 0.180 |
| 2 | 32.487 | 29.862 | −0.007 | 0 385 |
| 3 | 4.037 | 55.522 | −0.036 | 0.366 |

First-Order Data

| | | | |
|---|---|---|---|
| f/number | 3.00 | 3.00 | 3.00 |
| Magnification | −0.0070 | −0.0070 | −0.0070 |
| Object Height | −2750.0 | −2750.0 | −2750.0 |
| Object Distance | −4421.6 | −6083.2 | −8407.4 |
| Effective Focal Length | 31.431 | 43.011 | 59.208 |
| Image Distance | 0.17984 | 0.38515 | 0.36635 |
| Overall Length | 4860.4 | 6501.9 | 8823.3 |
| Forward Vertex Distance | 438.78 | 418.73 | 415.92 |
| Barrel Length | 438.60 | 418.34 | 415.55 |
| Stop Surface Number | 6 | 6 | 6 |
| Distance to Stop | 35.40 | 0.00 | 2.02 |
| Stop Diameter | 27.413 | 28.067 | 39.814 |
| Entrance Pupil Distance | 67.952 | 60.936 | 61.463 |
| Exit Pupil Distance | 1855.2 | 8858.9 | −331.25 |

First Order Properties of Elements

| Element Number | Surface Numbers | | Power | f |
|---|---|---|---|---|
| 1 | 1 | 2 | −0.87250E−02 | −114.61 |
| 2 | 4 | 5 | −0.11955E−01 | −83.645 |
| 3 | 5 | 6 | 0.63262E−02 | 158.07 |
| 4 | 7 | 8 | −0.20135E−01 | −49.666 |
| 5 | 8 | 9 | 0.28858E−01 | 34.652 |
| 6 | 10 | 11 | 0.13474E−01 | 74.218 |
| 7 | 11 | 12 | −0.16696E−01 | −59.893 |
| 8 | 13 | 14 | −0.16242E−01 | −61.570 |
| 9 | 14 | 15 | 0.94463E−02 | 105.86 |
| 10 | 16 | 17 | 0.10428E−01 | 95.893 |
| 11 | 18 | 19 | 0.25836E−02 | 387.06 |

First-Order Properties of Doublets

| Element Number | | Surface Numbers | | Power | f |
|---|---|---|---|---|---|
| 2 | 3 | 4 | 6 | −0.55209E−02 | −181.13 |
| 4 | 5 | 7 | 9 | 0.96581E−02 | 103.54 |
| 6 | 7 | 10 | 12 | −0.30581E−02 | −327.00 |
| 8 | 9 | 13 | 15 | −0.60289E−02 | −165.87 |

Glass Table

| Elem. | Glass | Catalog | $n_d$ | $V_d$ | Q | $f/f_0$ |
|---|---|---|---|---|---|---|
| 1 | 490573 | PLASTICS | 1.489971 | 57.3 | 98.0 | −3.65 |
| 2 | FCD1 | HOYA | 1.496997 | 81.6 | 120.0 | −2.66 |
| 3 | FD14 | HOYA | 1.761823 | 26.6 | 40.0 | 5.03 |
| 4 | TAF3 | HOYA | 1.804200 | 46.5 | −44.0 | −1.58 |
| 5 | FD14 | HOYA | 1.761823 | 26.6 | 40.0 | 1.10 |
| 6 | FCD1 | HOYA | 1.496997 | 81.6 | 120.0 | 2.36 |
| 7 | FD4 | HOYA | 1.755199 | 27.5 | 31.0 | −1.91 |
| 8 | FD4 | HOYA | 1.755199 | 27.5 | 31.0 | −1.96 |
| 9 | FCD1 | HOYA | 1.496997 | 81.6 | 120.0 | 3.37 |
| 10 | FCD1 | HOYA | 1.496997 | 81.6 | 120.0 | 3.05 |
| 11 | 490573 | PLASTICS | 1.489971 | 57.3 | 98.0 | 12.31 |

TABLE 5

| Surf. No. | Type | Radius | Thickness | Glass | Clear Aperture Diameter |
|---|---|---|---|---|---|
| 1 | a | 316.4987 | 9.00000 | 490573 | 106.50 |
| 2 | ac | 48.5107 | 79.22000 | | 83.70 |

TABLE 5-continued

| | | | | |
|---|---|---|---|---|
| 3 | | −68.2336 | 4.10000 | FCD1 | 53.00 |
| 4 | | 290.7899 | 7.0000 | TAF3 | 53.00 |
| 5 | | −157.0756 | Space 1 | | 52.00 |
| 6 | | 154.9494 | 8.14000 | FD6D | 54.20 |
| 7 | | 758.2655 | Space 2 | | 55.40 |
| 8 | | −1067.2049 | 8.92000 | FCD1 | 65.80 |
| 9 | | −119.5453 | 13.48000 | | 67.20 |
| 10 | | −78.2658 | 6.00000 | FDS | 68.80 |
| 11 | | 158.5274 | 13.50000 | FCD1 | 77.70 |
| 12 | | −158.5274 | 0.10000 | | 79.90 |
| 13 | | 139.1541 | 16.70000 | FCD1 | 88.00 |
| 14 | | −176.7399 | 35.55000 | | 88.60 |
| 15 | | 112.2150 | 19.30000 | FCD1 | 89.00 |
| 16 | | −157.8763 | 0.90000 | | 88.00 |
| 17 | | −217.6579 | 8.00000 | FEL6 | 85.70 |
| 18 | | 217.6579 | 8.72000 | | 80.50 |
| 19 | a | −1204.7930 | 9.00000 | 490573 | 79.90 |
| 20 | | −266.7334 | Space 3 | | 79.70 |
| 21 | | ∞ | 17.00000 | | 80.00 |
| 22 | | ∞ | 55.00000 | BSC7 | 80.00 |
| 23 | | ∞ | 2.50000 | BSC7 | 70.00 |
| 24 | | ∞ | Image distance | | 70.00 |

Symbol Description a - Polynomial asphere
c - Conic section

Conics

| Surface Number | Constant |
|---|---|
| 2 | −1.2000E+00 |

Even Polynomial Aspheres

| Surf. No. | D | E | F | G | H | I |
|---|---|---|---|---|---|---|
| 1 | −3.7810E−08 | 3.8833E−11 | 4.3571E−15 | −1.0785E−18 | −3.9211E−22 | 6.9576E−26 |
| 2 | 4.3607E−07 | 1.0988E−10 | −3.6564E−14 | 2.5559E−17 | 1.2829E−20 | −7.5081E−24 |
| 19 | −7.7096E−07 | −5.1172E−11 | −2.0446E−14 | 1.5579E−17 | −2.9214E−21 | −7.1999E−25 |

Variable Spaces

| Zoom Pos. | Space 1 T(6) | Space 2 T(19) | Space 3 T(20) | Focal Shift | Image Distance |
|---|---|---|---|---|---|
| 1 | 78.612 | 26.342 | 19.043 | −0.064 | 0.453 |
| 2 | 40.873 | 26.342 | 30.135 | −0.088 | 0.432 |
| 3 | 7.086 | 26.342 | 44.452 | −0.089 | 0.409 |

First-Order Data

| | | | |
|---|---|---|---|
| f/number | 2.81 | 2.81 | 2.81 |
| Magnification | −0.0220 | −0.0220 | −0.0220 |
| Object Height | −1500.0 | −1400.0 | −1400.0 |
| Object Distance | −2265.8 | −2722.6 | −3311.0 |
| Effective Focal Length | 51.351 | 61.203 | 73.896 |
| Image Distance | 0.45274 | 0.43225 | 0.40922 |
| Overall Length | 2712.4 | 3142.5 | 3711.4 |
| Forward Vertex Distance | 446.58 | 419.91 | 400.42 |
| Barrel Length | 446.13 | 419.48 | 400.01 |
| Stop Surface Number | 5 | 5 | 5 |
| Distance to Stop | 39.31 | 20.44 | 3.54 |
| Stop Diameter | 39.840 | 43.740 | 48.851 |
| Entrance Pupil Distance | 66.614 | 62.226 | 57.560 |
| Exit Pupil Distance | 1550.9 | −1322.1 | −566.17 |

First Order Properties of Elements

| Element Number | Surface Numbers | | Power | f |
|---|---|---|---|---|
| 1 | 1 | 2 | −0.84577E−02 | −118.24 |
| 2 | 3 | 4 | −0.90270E−02 | −110.78 |
| 3 | 4 | 5 | 0.78305E−02 | 127.71 |
| 4 | 6 | 7 | 0.41594E−02 | 240.42 |
| 5 | 8 | 9 | 0.37032E−02 | 270.03 |

TABLE 5-continued

| | | | | |
|---|---|---|---|---|
| 6 | 10 | 11 | −0.12969E−01 | −77.105 |
| 7 | 11 | 12 | 0.61815E−02 | 161.77 |
| 8 | 13 | 14 | 0.62715E−02 | 159.45 |
| 9 | 15 | 16 | 0.73972E−02 | 135.19 |
| 10 | 17 | 18 | −0.49170E−02 | −203.38 |
| 11 | 19 | 20 | 0.14348E−02 | 696.98 |

First-Order Properties of Doublets

| Element Number | | Surface Numbers | | Power | f |
|---|---|---|---|---|---|
| 2 | 3 | 3 | 5 | −0.86100E−03 | −1161.4 |
| 6 | 7 | 10 | 12 | −0.62306E−02 | −160.50 |

Glass Table

| Elem. | Glass | Catalog | $n_d$ | $V_d$ | Q | $f/f_0$ |
|---|---|---|---|---|---|---|
| 1 | 490573 | PLASTICS | 1.489971 | 57.3 | 98.0 | −2.30 |
| 2 | FCD1 | HOYA | 1.496997 | 81.6 | 120.0 | −2.16 |
| 3 | TAF3 | HOYA | 1.804200 | 46.5 | −44.0 | 2.49 |
| 4 | FD60 | HOYA | 1.805181 | 25.5 | 55.0 | 4.68 |
| 5 | FCD1 | HOYA | 1.496997 | 81.6 | 120.0 | 5.26 |
| 6 | FD5 | HOYA | 1.672701 | 32.2 | 3.2 | −1.50 |
| 7 | FCD1 | HOYA | 1.496997 | 81.6 | 120.0 | 3.15 |
| 8 | FCD1 | HOYA | 1.496997 | 81.6 | 120.0 | 3.11 |
| 9 | FCD1 | HOYA | 1.496997 | 81.6 | 120.0 | 2.63 |
| 10 | FEL6 | HOYA | 1.531720 | 48.8 | −18.0 | −3.96 |
| 11 | 490573 | PLASTICS | 1.489971 | 57.3 | 98.0 | 13.57 |

TABLE 6

| Surf. No. | Type | Radius | Thickness | Glass | Clear Aperture Diameter |
|---|---|---|---|---|---|
| 1 | a | 53.1466 | 4.00000 | ACRYLIC | 42.52 |
| 2 | ac | 26.9064 | 9.56217 | | 36.15 |
| 3 | | −114.9651 | 4.50000 | S-LAH51 | 35.04 |
| 4 | | 43.7399 | 2.50000 | S-FPL51 | 34.46 |
| 5 | | 39.0015 | 3.00000 | | 29.98 |
| 6 | | ∞ | Space 1 | | 29.98 |
| 7 | | 200.0861 | 2.00000 | S-TIH11 | 24.87 |
| 8 | | 36.6439 | 5.00000 | S-LAH60 | 24.17 |
| 9 | | −120.4751 | 0.50000 | | 23.71 |
| 10 | a | 17.7399 | 5.00000 | ACRYLIC | 21.62 |
| 11 | a | 16.1139 | 9.31913 | | 18.76 |
| 12 | | Aperture stop | 18.20440 | | 16.94 |
| 13 | ac | −16.4549 | 5.00000 | ACRYLIC | 22.38 |
| 14 | a | −19.8793 | 0.50000 | | 26.42 |
| 15 | | 99.1823 | 8.50000 | S-LAL14 | 31.07 |
| 16 | | −29.3750 | 2.00000 | S-TIH10 | 31.76 |
| 17 | | −55.2706 | Space 2 | | 32.95 |
| 18 | | −62.8452 | 2.50000 | S-TIH10 | 34.23 |
| 19 | | 93.0148 | 5.00000 | S-LAL8 | 35.96 |
| 20 | | −1264.5589 | 0.50000 | | 36.80 |
| 21 | ac | 35.6906 | 10.00000 | ACRYLIC | 39.22 |
| 22 | a | −97.5062 | 7.00000 | | 39.54 |
| 23 | | ∞ | 25.00000 | BSC7 | 37.68 |
| 24 | | ∞ | 2.00000 | | 34.28 |
| 25 | | ∞ | 2.74000 | SIO2 | 33.89 |
| 26 | | ∞ | Image distance | | 33.53 |

Symbol Description a - Polynomial asphere
c - Conic section

Conics

| Surface Number | Constant |
|---|---|
| 2 | −6.3815E−01 |
| 13 | −1.5056E−01 |
| 21 | −1.1520E+00 |

TABLE 6-continued

Even Polynomial Aspheres

| Surf. No. | D | E | F | G | H | I |
|---|---|---|---|---|---|---|
| 1 | −1.5185E−06 | 7.3691E−09 | 4.7636E−12 | −1.2584E−14 | −2.4856E−17 | 4.8059E−20 |
| 2 | −1.2508E−06 | 6.3840E−09 | 4.7562E−11 | 1.4176E−14 | −4.9901E−16 | 8.3998E−19 |
| 10 | −1.5142E−05 | −4.4556E−08 | −3.0808E−11 | −6.7076E−14 | 5.5962E−16 | −1.1087E−17 |
| 11 | −2.0551E−05 | −6.2752E−08 | −8.1184E−11 | −4.5191E−13 | −2.5842E−15 | −8.2754E−18 |
| 13 | 3.9089E−06 | 3.9114E−08 | 5.7323E−10 | −1.5401E−11 | 1.1304E−13 | −2.6062E−16 |
| 14 | 3.0798E−06 | 4.7174E−08 | −1.8457E−10 | −6.3064E−13 | 8.2234E−15 | −1.6018E−17 |
| 21 | −7.1191E−07 | −9.7735E−10 | −3.5332E−13 | −2.1057E−14 | −1.2971E−17 | −1.1300E−19 |
| 22 | 5.3521E−06 | −8.8466E−09 | 1.2274E−11 | −4.4594E−15 | −1.7331E−16 | 1.2830E−19 |

Variable Spaces

| Zoom Pos. | Space 1 T(6) | Space 2 T(19) | Focal Shift | Image Distance |
|---|---|---|---|---|
| 1 | 15.384 | 23.057 | −0.079 | 0.821 |
| 2 | 3.560 | 35.282 | −0.082 | 0.838 |

First-Order Data

| | | |
|---|---|---|
| f/number | 2.83 | 3.10 |
| Magnification | −0.0043 | −0.0054 |
| Object Height | −3872.0 | −3083.0 |
| Object Distance | −7299.7 | −7297.7 |
| Effective Focal Length | 31.529 | 39.572 |
| Image Distance | 0.82058 | 0.83768 |
| Overall Length | 7473.2 | 7471.7 |
| Forward Vertex Distance | 173.59 | 174.01 |
| Barrel Length | 172.77 | 173.17 |
| Stop Surface Number | 12 | 12 |
| Distance to Stop | 0.00 | 0.00 |
| Stop Diameter | 16.693 | 16.548 |
| Entrance Pupil Distance | 33.923 | 30.753 |
| Exit Pupil Distance | −854.87 | −6620.9 |

First Order Properties of Elements

| Element Number | Surface Numbers | | Power | f |
|---|---|---|---|---|
| 1 | 1 | 2 | −0.85699E−02 | −116.69 |
| 2 | 3 | 4 | 0.11441E−01 | 87.405 |
| 3 | 4 | 5 | −0.24347E−G1 | −41.072 |
| 4 | 7 | 8 | −0.17399E−01 | −57.475 |
| 5 | 8 | 9 | 0.29253E−01 | 34.185 |
| 6 | 10 | 11 | 0.38110E−04 | 26240. |
| 7 | 13 | 14 | −0.26701E−02 | −374.52 |
| 8 | 15 | 16 | 0.29911E−01 | 33.432 |
| 9 | 16 | 17 | −0.11237E−01 | −88.989 |
| 10 | 18 | 19 | −0.19549E−01 | −51.154 |
| 11 | 19 | 20 | 0.82166E−02 | 121.70 |
| 12 | 21 | 22 | 0.18355E−01 | 54.481 |

First-Order Properties of Doublets

| Element Number | | Surface Numbers | | Power | f |
|---|---|---|---|---|---|
| 2 | 3 | 3 | 5 | −0.13082E−01 | −76.439 |
| 4 | 5 | 7 | 9 | 0.12054E−01 | 82.962 |
| 8 | 9 | 15 | 17 | 0.18613E−01 | 53.725 |
| 10 | 11 | 18 | 20 | −0.11162E−01 | −89.589 |

Glass Table

| Elem. | Glass | Catalog | $n_d$ | $V_d$ | Q | $f/f_0$ |
|---|---|---|---|---|---|---|
| 1 | ACRYLIC | PLASTICS | 1.491738 | 57.4 | 120.0 | −3.70 |
| 2 | S-LAH51 | OHARA | 1.785896 | 44.2 | 33.0 | 2.77 |
| 3 | S-FPL51 | OHARA | 1.496999 | 81.5 | 120.0 | −1.30 |
| 4 | S-TIH11 | OHARA | 1.784723 | 25.7 | 65.0 | −1.82 |
| 5 | S-LAH60 | OHARA | 1.834000 | 37.2 | −34.0 | 1.08 |
| 6 | ACRYLIC | PLASTICS | 1.491738 | 57.4 | 120.0 | 832.25 |
| 7 | ACRYLIC | PLASTICS | 1.491738 | 57.4 | 120.0 | −11.88 |
| 8 | S-LAL14 | OHARA | 1.696797 | 55.5 | 34.0 | 1.06 |

TABLE 6-continued

| 9 | S-TIH10 | OHARA | 1.728250 | 28.5 | 37.0 | −2.82 |
| 10 | S-TIH10 | OHARA | 1.728250 | 28.5 | 37.0 | −1.62 |
| 11 | S-LAL8 | OHARA | 1.712995 | 53.9 | −33.0 | 3.86 |
| 12 | ACRYLIC | PLASTICS | 1.491738 | 57.4 | 120.0 | 1.73 |

TABLE 7

| Surf. No. | Type | Radius | Thickness | Glass | Clear Aperture Diameter |
|---|---|---|---|---|---|
| 1 | a | 175.6293 | 8.00000 | 490573 | 114.70 |
| 2 | ac | 49.6670 | 109.50360 | | 92.80 |
| 3 | | −52.2360 | 3.40000 | FCD1 | 38.88 |
| 4 | | 140.9472 | 6.00000 | FDS90 | 38.10 |
| 5 | | 3357.6690 | Space 1 | | 39.12 |
| 6 | | 183.0864 | 4.00000 | S-LAL9 | 43.77 |
| 7 | | 44.5967 | 13.00000 | S-TIH10 | 45.36 |
| 8 | | −92.8846 | 0.10000 | | 46.01 |
| 9 | | 140.5650 | 10.00000 | FCD1 | 45.93 |
| 10 | | −62.0392 | 4.20000 | FD4 | 45.75 |
| 11 | | 827.4523 | 5.99376 | | 46.48 |
| 12 | | −59.2354 | 4.10000 | FD4 | 46.64 |
| 13 | | 134.9261 | 11.20000 | S-FPL52 | 51.99 |
| 14 | | −74.3776 | 14.32146 | | 54.37 |
| 15 | | 292.2230 | 13.00000 | S-FPL52 | 67.86 |
| 16 | | −85.7082 | 0.23000 | | 69.13 |
| 17 | | ∞ | 10.70000 | S-FPL52 | 69.89 |
| 18 | | −91.5651 | 0.50000 | | 70.14 |
| 19 | ac | −372.4648 | 8.00000 | 490573 | 68.63 |
| 20 | a | −433.2704 | Space 2 | | 67.98 |
| 21 | | ∞ | 35.00000 | BK7 | 60.00 |
| 22 | | ∞ | 1.00000 | | 55.00 |
| 23 | | ∞ | 67.50000 | BK7 | 55.00 |
| 24 | | ∞ | 4.00000 | | 44.00 |
| 25 | | ∞ | 3.00000 | ZKN7 | 44.00 |
| 26 | | ∞ | Image distance | | 44.00 |

Symbol Description a - Polynomial asphere
c - Conic section
Conics

| Surface Number | Constant |
|---|---|
| 2 | −7.4000E−01 |
| 19 | 3.0000E+01 |

Even Polynomial Aspheres

| Surf. No. | D | E | F | G | H | I |
|---|---|---|---|---|---|---|
| 1 | −2.5693E−07 | 1.6484E−10 | −5.1517E−14 | 1.8104E−18 | 2.723aE−21 | −4.1156E−25 |
| 2 | −2.1755E−07 | −1.4824E−10 | 4.9982E−13 | −4.8115E−16 | 1.9448E−19 | −2.8216E−23 |
| 19 | −3.9107E−07 | 3.4985E−11 | −1.1275E−13 | 1.8514E−16 | −1.1746E−19 | 1.7260E−23 |
| 20 | −7.8363E−09 | −5.8343E−11 | 2.1161E−13 | −2.1799E−16 | 1.2824E−19 | −4.2405E−23 |

Variable Spaces

| Zoom Pos. | Space 1 T(6) | Space 2 T(19) | Focal Shift | Image Distance |
|---|---|---|---|---|
| 1 | 67.439 | 24.780 | −0.057 | 0.542 |
| 2 | 33.926 | 44.123 | −0.103 | 0.524 |
| 3 | 7.647 | 72.100 | −0.062 | 0.497 |

First-Order Data

| | | | |
|---|---|---|---|
| f/number | 3.00 | 3.00 | 3.00 |
| Magnification | −0.0080 | −0.0080 | −0.0080 |
| Object Height | −2543.0 | −2500.0 | −2500.0 |
| Object Distance | −4111.0 | −5555.0 | −7635.4 |
| Effective Focal Length | 33.515 | 45.013 | 61.577 |
| Image Distance | 0.54203 | 0.52394 | 0.49679 |

TABLE 7-continued

| | | | |
|---|---|---|---|
| Overall Length | 4540.5 | 5970.3 | 8052.4 |
| Forward Vertex Distance | 429.51 | 415.32 | 416.99 |
| Barrel Length | 428.97 | 414.80 | 416.50 |
| Stop Surface Number | 5 | 5 | 5 |
| Distance to Stop | 33.72 | 16.96 | 3.82 |
| Stop Diameter | 28.303 | 33.263 | 40.609 |
| Entrance Pupil Distance | 78.111 | 75.072 | 71.970 |
| Exit Pupil Distance | 3164.9 | −584.91 | −370.29 |

First Order Properties of Elements

| Element Number | Surface Numbers | | Power | f |
|---|---|---|---|---|
| 1 | 1 | 2 | −0.69276E−02 | −144.35 |
| 2 | 3 | 4 | −0.13117E−01 | −76.238 |
| 3 | 4 | 5 | 0.57597E−02 | 173.62 |
| 4 | 6 | 7 | −0.11582E−01 | −86.341 |
| 5 | 7 | 8 | 0.23207E−01 | 43.090 |
| 6 | 9 | 10 | 0.11358E−01 | 88.047 |
| 7 | 10 | 11 | −0.13112E−01 | −76.265 |
| 8 | 12 | 13 | −0.18513E−01 | −54.016 |
| 9 | 13 | 14 | 0.93511E−02 | 106.94 |
| 10 | 15 | 16 | 0.68067E−02 | 146.91 |
| 11 | 17 | 18 | 0.49801E−02 | 200.80 |
| 12 | 19 | 20 | −0.17663E−03 | −5661.6 |

First-Order Properties of Doublets

| Element Number | Surface Numbers | | Power | f |
|---|---|---|---|---|
| 2 3 | 3 | 5 | −0.72433E−02 | −138.06 |
| 4 5 | 6 | 5 | 0.12101E−01 | 82.638 |
| 6 7 | 9 | 11 | −0.14202E−02 | −704.14 |
| 8 9 | 12 | 14 | −0.80103E−02 | −124.84 |

Glass Table

| Elem. | Glass | Catalog | $n_d$ | $V_d$ | Q | $f/f_0$ |
|---|---|---|---|---|---|---|
| 1 | 490573 | PLASTICS | 1.489972 | 57.3 | 92.0 | −4.31 |
| 2 | FCD1 | HOYA | 1.496997 | 81.6 | 120.0 | −2.27 |
| 3 | FDS90 | HOYA | 1.846664 | 23.8 | 70.0 | 5.18 |
| 4 | S-LAL9 | OHARA | 1.691002 | 54.8 | −29.0 | −2.58 |
| 5 | S-TIH10 | OHARA | 1.728250 | 28.5 | 37.0 | 1.29 |
| 6 | FCD1 | HOYA | 1.496997 | 81.6 | 120.0 | 2.63 |
| 7 | FD4 | HOYA | 1.755199 | 27.5 | 31.0 | −2.28 |
| 8 | FD4 | HOYA | 1.755199 | 27.5 | 31.0 | −1.61 |
| 9 | S-FPL52 | OHARA | 1.455999 | 90.3 | 140.0 | 3.19 |
| 10 | S-FPL52 | OHARA | 1.455999 | 90.3 | 140.0 | 4.38 |
| 11 | S-FPL52 | OHARA | 1.455999 | 90.3. | 140.0 | 5.99 |
| 12 | 490573 | PLASTICS | 1.489972 | 57.3 | 92.0 | −168.9 |

TABLE 8

| Surf. No. | Type | Radius | Thickness | Glass | Clear Aperture Diameter |
|---|---|---|---|---|---|
| 1 | a | −69.1029 | 3.00000 | ACRYLIC | 26.40 |
| 2 | ac | 12.0133 | 14.95814 | | 19.23 |
| 3 | | 52.8059 | 1.50000 | LAC8 | 14.36 |
| 4 | | 20.8924 | 4.00000 | FD6 | 13.55 |
| 5 | | 6822.6337 | 10.10479 | | 12.42 |
| 6 | | Aperture stop | 11.17415 | | 5.28 |
| 7 | | −21.0369 | 2.00000 | LAC8 | 12.88 |
| 8 | | −48.5214 | 0.00000 | | 14.65 |
| 9 | | 69.3003 | 9.00000 | FCD1 | 15.73 |
| 10 | | −11.6491 | 1.80000 | NBFD10 | 18.13 |
| 11 | | −24.2392 | 0.50000 | | 21.25 |
| 12 | | 81.0635 | 7.00000 | FCD1 | 24.14 |
| 13 | | −22.5172 | 0.02752 | | 24.99 |
| 14 | | −161.0142 | 4.00000 | ACRYLIC | 24.65 |
| 15 | a | −38.3180 | 1.19361 | | 24.62 |
| 16 | | ∞ | 25.40000 | SF1 | 24.25 |
| 17 | | ∞ | 25.40000 | BK7 | 22.15 |

TABLE 8-continued

| | | | | |
|---|---|---|---|---|
| 18 | ∞ | 1.35000 | BK7 | 19.76 |
| 19 | ∞ | 0.00022 | | 19.63 |

Symbol Description a - Polynomial asphere
c - Conic section

Conics

| Surface Number | Constant |
|---|---|
| 2 | −1.6440E−01 |

Even Polynomial Aspheres

| Surf. No. | D | E | F | G | H | I |
|---|---|---|---|---|---|---|
| 1 | 9.2240E−05 | −4.1721E−07 | 2.5954E−10 | 6.5126E−12 | −2.9931E−14 | 4.4923E−17 |
| 2 | 3.0646E−05 | 4.8714E−07 | −8.0S16E−09 | −3.5004E−11 | 5.8691E−13 | −1.8014E−15 |
| 15 | 2.3562E−05 | 7.3015E−09 | 1.0779E−10 | −5.4851E−14 | −4.0961E−15 | 1.9036E−17 |

First Order Data

| | | | |
|---|---|---|---|
| f/number | 5.00 | Overall Length | 1120.06 |
| Magnification | −0.0129 | Forward Vertex Distance | 122.408 |
| Object Height | −762.00 | Barrel Length | 122.408 |
| Object Distance | −997.650 | Entrance Pupil Distance | 14.2373 |
| Effective Focal Length | 13.0189 | Exit Pupil Distance | 2262.27 |
| Image Distance | 0.224818E−03 | Stop Diameter | 5.159 |
| Stop Surface Number | 6 | Distance to Stop | 0.00 |

First Order Properties of Elements

| Element Number | Surface Numbers | | Power | f |
|---|---|---|---|---|
| 1 | 1 | 2 | −0.48838E−01 | −20.476 |
| 2 | 3 | 4 | −0.20310E−01 | −49.237 |
| 3 | 4 | 5 | 0.38788E−01 | 25.781 |
| 4 | 7 | 8 | −0.18698E−01 | −53.483 |
| 5 | 9 | 10 | 0.48133E−01 | 20.776 |
| 6 | 10 | 11 | −0.34981E−01 | −28.587 |
| 7 | 12 | 13 | 0.27649E−01 | 36.167 |
| 8 | 14 | 15 | 0.99254E−02 | 100.75 |

First-Order Properties of Doublets

| Element Number | | Surface Numbers | | Power | f |
|---|---|---|---|---|---|
| 2 | 3 | 3 | 5 | 0.18013E−01 | 55.516 |
| 5 | 6 | 9 | 11 | 0.13032E−01 | 76.735 |

Glass Table

| Elem. | Glass | Catalog | $n_d$ | $V_d$ | Q | $f/f_0$ |
|---|---|---|---|---|---|---|
| 1 | Acrylic | Plastics | 1.491738 | 57.4 | 120.0 | −1.57 |
| 2 | LAC8 | Hoya | 1.713000 | 53.9 | −40.0 | −3.78 |
| 3 | ED6 | Hoya | 1.805184 | 25.5 | 48.0 | 1.98 |
| 4 | LAC8 | Hoya | 1.713000 | 53.9 | −40.0 | −4.11 |
| 5 | FCD1 | Hoya | 1.496997 | 81.6 | 120.0 | 1.60 |
| 6 | NBFD10 | Hoya | 1.834001 | 37.3 | −18.0 | −2.20 |
| 7 | FCD1 | Hoya | 1.496997 | 81.6 | 120.0 | 2.78 |
| 8 | Acrylic | Plastics | 1.491738 | 57.4 | 120.0 | 7.74 |

TABLE 9

| Surf. No. | Type | Radius | Thickness | Glass | Clear Aperture Diameter |
|---|---|---|---|---|---|
| 1 | a | −135.7116 | 4.00000 | ACRYLIC | 27.90 |
| 2 | ac | 12.4471 | 17.12749 | | 19.45 |
| 3 | | 91.5459 | 1.50000 | S-LAL18 | 12.63 |
| 4 | | 14.5117 | 4.00000 | S-TIH14 | 11.70 |

TABLE 9-continued

| | | | | | |
|---|---|---|---|---|---|
| 5 | | 372.2407 | 8.68741 | | 10.63 |
| 6 | | Aperture stop | 11.21190 | | 5.31 |
| 7 | | −61.0315 | 7.00000 | S-FPL53 | 13.10 |
| 8 | | −11.4137 | 1.80000 | LAF7 | 15.62 |
| 9 | | −27.4207 | 0.50000 | | 18.25 |
| 10 | | 147.8397 | 5.50000 | S-FPL53 | 20.31 |
| 11 | | −25.0976 | 0.50000 | | 21.70 |
| 12 | | −213.9106 | 5.00000 | S-FPL53 | 22.59 |
| 13 | | −29.2561 | 0.25000 | | 23.34 |
| 14 | | −162.7705 | 4.00000 | ACRYLIC | 23.36 |
| 15 | a | −37.7819 | 1.72992 | | 23.50 |
| 16 | | ∞ | 25.40000 | SF1 | 23.05 |
| 17 | | ∞ | 25.40000 | BK7 | 20.99 |
| 18 | | ∞ | 1.3S000 | BK7 | 18.67 |
| 19 | | ∞ | −0.00262 | | 18.55 |

Symbol Description a - Polynomial asphere
c - Conic section

Conics

| Surface Number | Constant |
|---|---|
| 2 | −1.6440E−01 |

Even Polynomial Aspheres

| Surf. No. | D | E | F | G | H | I |
|---|---|---|---|---|---|---|
| 1 | 9.2449E−05 | −4.5052E−07 | 5.130SE−10 | 6.8379E−12 | −3.3826E−14 | 4.6808E−17 |
| 2 | 6.4988E−05 | 5.0156E−07 | −1.2742E−08 | 1.8984E−12 | 1.2845E−12 | −7.6365E−15 |
| 15 | 1.5415E−05 | −2.4240E−09 | 1.5005E−10 | −1.2277E−12 | 5.0941E−15 | −6.9312E−18 |

First Order Data

| | | | |
|---|---|---|---|
| f/number | 5.00 | Overall Length | 1129.95 |
| Magnification | −0.0121 | Forward Vertex Distance | 124.954 |
| Object Height | −762.00 | Barrel Length | 124.957 |
| Object Distance | −1004.99 | Entrance Pupil Distance | 15.5203 |
| Effective Focal Length | 12.3908 | Exit Pupil Distance | −7405.44 |
| Image Distance | −.261753E−02 | Stop Diameter | 5.194 |
| Stop Surface Number | 6 | Distance to Stop | 0.00 |

First Order Properties of Elements

| Element Number | Surface Numbers | | Power | f |
|---|---|---|---|---|
| 1 | 1 | 2 | −0.43695E−01 | −22.886 |
| 2 | 3 | 4 | −0.42116E−01 | −23.744 |
| 3 | 4 | 5 | 0.51146E−01 | 19.552 |
| 4 | 7 | 8 | 0.32680E−01 | 30.599 |
| 5 | 8 | 9 | −0.36726E−01 | −27.229 |
| 6 | 10 | 11 | 0.20302E−01 | 49.257 |
| 7 | 12 | 13 | 0.13086E−01 | 76.420 |
| 8 | 14 | 15 | 0.10142E−01 | 98.603 |

First-Order Properties of Doublets

| Element Number | | Surface Numbers | | Power | f |
|---|---|---|---|---|---|
| 2 | 3 | 3 | 5 | 0.84789E−02 | 117.94 |
| 4 | 5 | 7 | 9 | −0.62549E−02 | −159.87 |

Glass Table

| Elem. | Glass | Catalog | $n_d$ | $V_d$ | Q | $f/f_o$ |
|---|---|---|---|---|---|---|
| 1 | Acrylic | PLASTICS | 1.491738 | 57.4 | 120.0 | −1.84 |
| 2 | S-LAL18 | Ohara | 1.729157 | 54.7 | −32.0 | −1.92 |
| 3 | S-TIH14 | Ohara | 1.761821 | 26.5 | 54.0 | 1.58 |
| 4 | S-FPL53 | Ohara | 1.438750 | 95.0 | 160.0 | 2.47 |
| 5 | LAF7 | Hoya | 1.749497 | 35.0 | −32.0 | −2.20 |
| 6 | S-FPL53 | Ohara | 1.438750 | 95.0 | 160.0 | 3.97 |
| 7 | S-FPL53 | Ohara | 1.438750 | 95.0 | 160.0 | 6.17 |
| 8 | Acrylic | PLASTICS | 1.491738 | 57.4 | 120.0 | 7.95 |

TABLE 10*

| Ex. | $f_0$ | $f_1$ | $f_2$ | $V_{U2/C}$ | 2h' | d | $0.1/(p' \cdot F\#_{U2})$ |
|---|---|---|---|---|---|---|---|
| 1A | 13.48 | −71.28 | 27.85 | 118.6 | 20.27 | 0.0138 | 71.1 |
| 1C | 13.42 | −72.20 | 29.20 | 114.5 | 20.27 | 0.0138 | 67.5 |
| 1E | 13.28 | −38.97 | 31.63 | 133.8 | 20.27 | 0.0138 | 61.7 |
| 2A | 12.03 | −34.14 | 25.34 | 133.0 | 17.91 | 0.0120 | 70.9 |
| 2B | 12.02 | −24.15 | 24.78 | 117.2 | 17.91 | 0.0120 | 72.4 |
| 3 | 18.31 | −191.82 | 37.87 | 128.0 | 32.84 | 0.0152 | 104.5 |
| 4 | 31.43 | −53.24 | 84.01 | 188.0 | 38.50 | 0.0190 | 75.8 |
| 5 | 51.35 | −104.42 | 115.30 | 167.5 | 66.00 | 0.0280 | 105.0 |
| 7 | 33.52 | −51.21 | 85.87 | 188.0 | 40.69 | 0.0170 | 93.4 |
| 8 | 13.02 | −56.99 | 25.84 | 114.7 | 19.66 | 0.0120 | 82.6 |
| 9 | 12.39 | −34.14 | 25.90 | 144.3 | 18.44 | 0.0120 | 73.5 |

*p' = d/$f_0$ where d is the pixel width in millimeters.
$F\#_{U2}$ = $f_2$/2h' where 2h' is the maximum object diagonal.

TABLE 11*

| Example | Max 1/2 FOV (deg.) | Max Distortion (%) | Lateral Color at 0.7 Field ($\mu$) | Lateral Color at 1.0 Field ($\mu$) | Pixel Size ($\mu$) | BFL/$f_0$ |
|---|---|---|---|---|---|---|
| 1A | 37.0 | 0.10 | 5.6 | 6.4 | 13.8 | 2.2 |
| 1B | 37.0 | 0.25 | 7.3 | 8.7 | 13.8 | 2.4 |
| 1C | 37.0 | 0.25 | 5.6 | 6.8 | 13.8 | 2.4 |
| 1D | 37.0 | 0.25 | 4.4 | 9.6 | 13.8 | 2.5 |
| 1E | 37.0 | 0.25 | 7.4 | 8.5 | 13.8 | 3.1 |
| 1F | 37.0 | 0.25 | 6.8 | 10.0 | 13.8 | 2.5 |
| 1G | 37.0 | 0.25 | 3.7 | 5.2 | 13.8 | 2.5 |
| 1H | 37.0 | 0.25 | 7.8 | 11.7 | 13.8 | 2.5 |
| 2A | 36.6 | 0.10 | 5.8 | 8.5 | 12.0 | 2.9 |
| 2B | 36.6 | 0.10 | 8.1 | 9.6 | 12.0 | 2.9 |
| 3 | 41.7 | 0.15 | 6.0 | 6.8 | 15.2 | 2.1 |
| 4 | 31.4 | 0.10 | 8.8 | 16.3 | 19.0 | 3.5 |
| 5 | 32.7 | 1.00 | 11.4 | 17.5 | 28.0 | 1.5 |
| 6 | 27.8 | 0.15 | 8.3 | 9.5 | 13.8 | 0.9 |
| 7 | 31.2 | 0.50 | 8.9 | 15.0 | 17.0 | 3.0 |
| 8 | 37.0 | 0.10 | 5.8 | 7.0 | 12.0 | 2.6 |
| 9 | 36.7 | 0.10 | 5.2 | 6.8 | 12.0 | 2.8 |

*Lateral color values were determined from the chromatic blur in the image focal plane for wavelengths in the range from 460 nanometers to 620 nanometers.
Pixel size is pixel width.

What is claimed is:

1. A projection lens for forming an image of an object which consists in order from its image end to its object end of:

(A) a first lens unit $U_1$ having a negative power and comprising three lens elements $E_P$, $E_N$, and $E_{N'}$, arranged in any order and having focal lengths $f_{U1/P}$, $f_{U1/N}$, and $f_{U1/N'}$, V-values $V_{U1/P}$, $V_{U1/N}$, and $V_{U1/N'}$, and Q-values $Q_{U1/P}$, $Q_{U1/N}$, and $Q_{U1/N'}$, respectively;

(B) a second lens unit having a positive power; and (C) an optional field lens unit;

wherein $E_N$ or $E_{N'}$ is made of glass and wherein:

$f_{U1/P}>0$,
$f_{U1/N}<0$,
$f_{U1/N'}<0$,
$V_{U1/N}>V_{U1/P}$,
$V_{U1/N'}>V_{U1/P}$,
$Q_{U1/N}>0$,
$Q_{U1/N}>Q_{U1/P}$,
$Q_{U1/N'}>V_{U1/N}$,
$Q_{U1/N'}>0$, and
$Q_{U1/N'}>Q_{U1/P}$.

2. The projection lens of claim 1 wherein $Q_{U1/N}>V_{U1/N}$.

3. The projection lens of claim 1 wherein $Q_{U1/P}<0$.

4. A projection lens for forming an image of an object which consists in order from its image end to its object end of:

(A) a first lens unit $U_1$ having a negative power and comprising two lens elements $E_P$ and $E_N$, arranged in any order and having focal lengths $f_{U1/P}$ and $f_{U1/N}$, V-values $V_{U1/P}$ and $V_{U1/N}$, and Q-values $Q_{U1/P}$ and $Q_{U1/N}$, respectively;

(B) a second lens unit having a positive power; and (C) an optional field lens unit;

wherein $E_N$ is made of glass and wherein:

$f_{U1/P}>0$,
$f_{U1/N}<0$,
$V_{U1/N}>V_{U1/P}$,
$Q_{U1/N}>0$, and
$Q_{U1/P}<0$.

5. A projection lens for forming an image of an object which consists in order from its image end to its object end of:

(A) a first lens unit $U_1$ having a negative power and comprising two lens elements $E_P$ and $E_N$, arranged in any order and having focal lengths $f_{U1/P}$ and $f_{U1/N}$, V-values $V_{U1/P}$ and $V_{U1/N}$, and Q-values $Q_{U1/P}$ and $Q_{U1/N}$, respectively;

(B) a second lens unit having a positive power; and (C) an optional field lens unit;

wherein:

$f_{U1/P}>0$,
$V_{U1/N}>V_{U1/P}$,
$Q_{U1/N}>V_{U1/N}$, and
$Q_{U1/N}>125$.

6. A projection lens for forming an image of an object which consists in order from its image end to its object end of:

(A) a first lens unit $U_1$ having a negative power;

(B) a second lens unit $U_2$ having a positive power and comprising two lens elements $E'_P$ and $E'_N$, arranged in any order and having focal lengths $f_{U2/P}$ and $f_{U2/N}$, V-values $V_{U2/P}$ and $V_{U2/N}$, and Q-values $Q_{U2/P}$ and $Q_{U2/N}$, respectively; and (C) an optional field lens unit;
wherein:

$f_{U2/P} > 0$, $f_{U2/N} < 0$, $V_{U2/P} > V_{U2/N}$, $Q_{U2/P} > V_{U2/P}$, and $Q_{U2/P} > 135$.

7. A projection lens for forming an image of an object composed of pixels, said projection lens consisting in order from its image end to its object end of:

(A) a first lens unit $U_1$ having a negative power;

(B) an aperture stop or a pseudo-aperture stop;

(C) a second lens unit $U_2$ having a positive power and comprising a positive lens elements having a V-value $V_{U2/P}$; and (D) an optional field lens unit;

wherein:

$V_{U2/P} > 75$, and $V_{U2/C} > 0.1/(p' \cdot F\#_{U2})$, where $F\#_{U2}$ is the f-number of the second lens unit as traced from the object towards the image, p' is the width of a pixel divided by $f_0$, where $f_1$ is the focal length of the combination of the first and second lens units, and $V_{U2/C}$ is a composite V-value for the second lens unit given by:

$$V_{U2/C} = f_{U2}\{\Sigma(V_{U2/i}/f_{U2/i})\}$$

where $f_{U2}$ is the focal length of the second lens unit, $f_{U2/i}$ and $V_{U2/i}$ are the focal length and V-value of the $i^{th}$ lens element of the second lens unit, and the summation is over all lens elements of the second lens unit.

8. A projection lens for forming an image of an object composed of pixels, said projection lens consisting in order from its image end to its object end of:

(A) a first lens unit having a negative power and comprising means for correcting the secondary lateral color of the projection lens, said means comprising two lens elements $E_P$ and $E_N$, arranged in any order and having focal lengths $f_{U1/P}$ and $f_{U1/N}$, V-values $V_{U1/P}$ and $V_{U1/N}$, and Q-values $Q_{U1/P}$ and $Q_{U1/N}$, respectively;

(B) a second lens unit having a positive power; and (C) an optional field lens unit;

wherein:

$f_{U1/P} > 0$, $f_{U1/N} < 0$, $V_{U1/N} > V_{U1/P}$, $Q_{U1/N} > 0$, and $Q_{U1/P} < 0$.

9. The projection lens of claim 1, 4, 5, 6, 7, or 8 wherein:

$BFL/f_0 > 0.7$, where $f_0$ and BFL are the focal length and the back focal length, respectively, of the combination of the first and second lens units.

10. The projection lens of claim 1, 4, 5, 6, or 8 wherein the projection lens has an aperture stop or a pseudo-aperture stop and the first lens unit is on the image side of said aperture stop or pseudo-aperture stop and the second lens unit is on the object side of said aperture stop or pseudo-aperture stop.

11. The projection lens of claim 1 wherein the projection lens has an aperture stop or a pseudo-aperture stop and $E_P$, $E_N$, and $E_{N'}$ are on the image side of said aperture stop or pseudo-aperture stop.

12. The projection lens of claim 4 or 5 wherein the projection lens has an aperture stop or a pseudo-aperture stop and $E_P$ and $E_N$ are on the image side of said aperture stop or pseudo-aperture stop.

13. The projection lens of claim 6 wherein the projection lens has an aperture stop or a pseudo-aperture stop and $E'_P$ and $E'_N$ are on the object side of said aperture stop or pseudo-aperture stop.

14. The projection lens of claim 1, 4, 5, 6, 7, or 8 wherein the projection lens is telecentric in the direction of the object.

15. The projection lens of claim 1, 4, 5, 6, 7, or 8 wherein the first lens unit comprises an aspherical surface.

16. The projection lens of claim 1, 4, 5, 6, 7, or 8 wherein the second lens unit comprises an aspherical surface.

17. The projection lens of claim 1, 4, 5, 6, 7, or 8 wherein the lens is a zoom lens.

18. The projection lens of claim 1, 4, 5, or 8 wherein the second lens unit comprises two lens elements $E'_P$ and $E'_N$, arranged in any order and having focal lengths $f_{U2/P}$ and $f_{U2/N}$, V-values $V_{U2/P}$ and $V_{U2/N}$, and Q-values $Q_{U2/P}$ and $Q_{U2/N}$, respectively, where:

$f_{U2/P} > 0$, $f_{U2/N} < 0$, $V_{u2/P} > V_{U2/N}$, $Q_{U2/P} > 0$, $Q_{U2/P} > Q_{U2/N}$, and $Q_{U2/P} > V_{U2/P}$.

19. The projection lens of claim 18 wherein:

$Q_{U2/P} > 135$.

20. The projection lens of claim 18 wherein:

$Q_{U2/N} < 0$.

21. A projection lens system for forming an image of an object, said system comprising:

(a) an illumination system comprising a light source and illumination optics which forms an image of the light source, said image of the light source being the output of the illumination system;

(b) a pixelized panel which comprises the object; and (c) the projection lens of claim 1, 4, 5, 6, 7, or 8.

22. The projection lens system of claim 21 wherein said projection lens has an entrance pupil whose location substantially corresponds to the location of the output of the illumination system.

23. The projection lens system of claim 21 wherein the projection lens is a zoom lens.

24. The projection lens of claim 1, 4, 5, or 8 wherein $E_P$ and $E_N$ or $E_{N'}$ form a color correcting doublet.

25. A projection lens for forming an image of an object composed of pixels, said projection lens consisting in order from its image end to its object end of:

(A) a first lens unit having a negative power;

(B) a second lens unit having a positive power; and (C) an optional field lens unit;

wherein:

(i) the projection lens has a half field of view in the direction of the image of at least 25°;

(ii) the lateral color blur of the projection lens at its full field is less than a pixel for wavelengths in the range from 460 nanometers to 620 nanometers;

(iii) the distortion of the projection lens is less than 1.0 percent;

(iv) the projection lens is telecentric in the direction of the object;

(v) the projection lens is a zoom lens and has a short focal length position; and (vi) the half field of view, lateral color blur, and distortion are evaluated at the short focal length position.

26. The projection lens of claim 25 wherein:

$$BFL/f_0 > 0.7,$$

where $f_0$ and BFL are the focal length and the back focal length, respectively, of the combination of the first and second lens units.

27. The projection lens of claim 25 wherein the projection lens has an aperture stop or a pseudo-aperture stop and the first lens unit is on the image side of said aperture stop or pseudo-aperture stop and the second lens unit is on the object side of said aperture stop or pseudo-aperture stop.

28. The projection lens of claim 25 wherein the first lens unit comprises an aspherical surface.

29. The projection lens of claim 25 wherein the second lens unit comprises an aspherical surface.

30. A projection lens system for forming an image of an object, said system comprising:

(a) an illumination system comprising a light source and illumination optics which forms an image of the light source, said image of the light source being the output of the illumination system;

(b) a pixelized panel which comprises the object; and (c) the projection lens of claim 25.

31. The projection lens system of claim 30 wherein said projection lens has an entrance pupil whose location substantially corresponds to the location of the output of the illumination system.

* * * * *